US011914369B2

(12) United States Patent
Liu et al.

(10) Patent No.: US 11,914,369 B2
(45) Date of Patent: Feb. 27, 2024

(54) MULTI-SENSOR ENVIRONMENTAL MAPPING

(71) Applicant: SZ DJI TECHNOLOGY CO., LTD., Shenzhen (CN)

(72) Inventors: Ang Liu, Shenzhen (CN); Weiyu Mo, Shenzhen (CN); Yonggen Ling, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 473 days.

(21) Appl. No.: 17/157,905

(22) Filed: Jan. 25, 2021

(65) Prior Publication Data
US 2021/0247764 A1 Aug. 12, 2021

Related U.S. Application Data

(63) Continuation of application No. 16/574,848, filed on Sep. 18, 2019, now Pat. No. 10,901,419, which is a (Continued)

(51) Int. Cl.
G05D 1/00 (2006.01)
G05D 1/10 (2006.01)
(Continued)

(52) U.S. Cl.
CPC ......... *G05D 1/0088* (2013.01); *B64C 39/024* (2013.01); *G01C 21/3848* (2020.08);
(Continued)

(58) Field of Classification Search
CPC .... G05D 1/0088; G05D 1/102; B64C 39/024; B64C 2201/141; G01C 21/3848; G01C 21/28; G01C 21/32; G01S 19/42
See application file for complete search history.

(56) References Cited

U.S. PATENT DOCUMENTS 5,173,947 A 12/1992 Chande
5,631,640 A 5/1997 Deis et al.
(Continued)

FOREIGN PATENT DOCUMENTS

CA 2830009 A1 6/2014
CN 101403620 A 4/2009
(Continued)

OTHER PUBLICATIONS

John Mechant, Image information needed for autonomous systems, 2005, SPIE vol. 5807, pp. 261-272 (Year: 2005).*
(Continued)

*Primary Examiner* — Bhavesh V Amin
(74) *Attorney, Agent, or Firm* — ANOVA LAW GROUP, PLLC

(57) ABSTRACT

A method for controlling a UAV in an environment includes receiving first and second sensing signals from a vision sensor and a proximity sensor, respectively, coupled to the UAV. The first and second sensing signals include first and second depth information of the environment, respectively. The method further includes selecting the first and second sensing signals for generating first and second portions of an environmental map, respectively, based on a suitable criterion associated with distinct characteristics of various portions of the environment or distinct capabilities of the vision sensor and the proximity sensor, generating first and second sets of depth images for the first and second portions of the environmental map, respectively, based on the first and second sensing signals, respectively, combining the first and second sets of depth images to generate the environmental map; and effecting the UAV to navigate in the environment using the environmental map.

20 Claims, 17 Drawing Sheets

Related U.S. Application Data continuation of application No. 14/814,159, filed on Jul. 30, 2015, now Pat. No. 10,429,839, which is a continuation of application No. PCT/CN2014/086007, filed on Sep. 5, 2014.

(51) Int. Cl.
| | | |
|---|---|---|
| *G01C 21/00* | (2006.01) | |
| *B64C 39/02* | (2023.01) | |
| *G01S 19/42* | (2010.01) | |

(52) U.S. Cl.
CPC ......... *G05D 1/102* (2013.01); *B64U 2201/10* (2023.01); *G01S 19/42* (2013.01)

(56) References Cited

U.S. PATENT DOCUMENTS

| | | | |
|---|---|---|---|
| 5,682,229 A | 10/1997 | Wangler | |
| 5,716,032 A | 2/1998 | McIngvale | |
| 5,785,281 A | 7/1998 | Peter et al. | |
| 6,056,237 A | 5/2000 | Woodland | |
| 6,122,572 A | 9/2000 | Yavnai | |
| 6,377,875 B1 | 4/2002 | Schwaerzler | |
| 6,377,889 B1 | 4/2002 | Soest | |
| 6,597,987 B1 | 7/2003 | Barton | |
| 6,661,918 B1 | 12/2003 | Gordon et al. | |
| 6,804,607 B1 | 10/2004 | Wood | |
| 6,985,810 B2 | 1/2006 | Moitra et al. | |
| 7,107,148 B1 | 9/2006 | Bodin et al. | |
| 7,130,741 B2 | 10/2006 | Bodin et al. | |
| 7,158,877 B2 | 1/2007 | Carlsson et al. | |
| 7,195,200 B2 | 3/2007 | Yamane | |
| 7,228,232 B2 | 6/2007 | Bodin et al. | |
| 7,231,294 B2 | 6/2007 | Bodin et al. | |
| 7,242,791 B2 | 7/2007 | Han et al. | |
| 7,266,477 B2 | 9/2007 | Foessel | |
| 7,302,316 B2 | 11/2007 | Beard et al. | |
| 7,431,243 B1 | 10/2008 | Allen | |
| 7,494,320 B2 | 2/2009 | Muren | |
| 7,512,462 B2 * | 3/2009 | Nichols | G08G 5/0056 701/3 |
| 7,571,051 B1 | 8/2009 | Shulman | |
| 7,606,115 B1 | 10/2009 | Cline et al. | |
| 7,737,878 B2 | 6/2010 | Van et al. | |
| 7,747,067 B2 | 6/2010 | Popescu et al. | |
| 7,792,330 B1 | 9/2010 | Lowder et al. | |
| 7,979,174 B2 | 7/2011 | Fregene et al. | |
| 8,072,581 B1 | 12/2011 | Breiholz | |
| 8,082,102 B2 | 12/2011 | Ravenscroft | |
| 8,108,092 B2 | 1/2012 | Phillips et al. | |
| 8,108,139 B1 | 1/2012 | Pylant | |
| 8,116,928 B2 | 2/2012 | Wu et al. | |
| 8,275,544 B1 | 9/2012 | Wells et al. | |
| 8,355,834 B2 | 1/2013 | Duggan et al. | |
| 8,374,786 B2 | 2/2013 | Buros | |
| 8,378,881 B2 | 2/2013 | Lemire et al. | |
| 8,380,425 B2 | 2/2013 | Duggan et al. | |
| 8,401,225 B2 | 3/2013 | Newcombe et al. | |
| 8,521,339 B2 | 8/2013 | Gariepy et al. | |
| 8,538,673 B2 | 9/2013 | Sislak et al. | |
| 8,543,265 B2 | 9/2013 | Ekhaguere et al. | |
| 8,566,071 B2 | 10/2013 | Shumaker | |
| 8,666,661 B2 | 3/2014 | Higgins | |
| 8,676,498 B2 | 3/2014 | Ma et al. | |
| 8,711,206 B2 * | 4/2014 | Newcombe | G06T 7/20 348/46 |
| 8,712,679 B1 | 4/2014 | Mostofi et al. | |
| 8,798,922 B2 * | 8/2014 | Tillotson | G08G 5/0039 701/474 |
| 8,825,226 B1 * | 9/2014 | Worley, III | H04W 4/021 180/274 |
| 8,868,328 B1 * | 10/2014 | Estkowski | G08G 5/0034 701/301 |
| 8,909,391 B1 * | 12/2014 | Peeters | G08G 5/0013 709/201 |
| 8,996,207 B2 * | 3/2015 | Goossen | G05D 1/0684 701/18 |
| 9,031,782 B1 * | 5/2015 | Lemay | G06T 7/277 701/445 |
| 9,051,043 B1 * | 6/2015 | Peeters | G05D 1/102 |
| 9,056,676 B1 * | 6/2015 | Wang | B64F 1/222 |
| 9,085,354 B1 * | 7/2015 | Peeters | B64C 29/02 |
| 9,164,506 B1 * | 10/2015 | Zang | G06F 3/04883 |
| 9,367,067 B2 * | 6/2016 | Gilmore | G05D 1/12 |
| 9,592,911 B2 | 3/2017 | Liu et al. | |
| 9,592,912 B1 * | 3/2017 | Michini | B64C 39/024 |
| 9,604,723 B2 | 3/2017 | Liu et al. | |
| 9,625,907 B2 | 4/2017 | Hu et al. | |
| 9,625,909 B2 * | 4/2017 | Hu | G08G 5/045 |
| 10,429,839 B2 * | 10/2019 | Liu | B64C 39/024 |
| 10,901,419 B2 * | 1/2021 | Liu | G01C 21/3848 |
| 2003/0055540 A1 | 3/2003 | Hansen | |
| 2003/0152892 A1 * | 8/2003 | Huang | F41G 3/2694 434/11 |
| 2003/0191561 A1 | 10/2003 | Vos | |
| 2004/0028258 A1 | 2/2004 | Naimark et al. | |
| 2004/0167667 A1 | 8/2004 | Goncalves et al. | |
| 2004/0193334 A1 | 9/2004 | Carlsson et al. | |
| 2005/0004723 A1 | 1/2005 | Duggan et al. | |
| 2005/0109872 A1 | 5/2005 | Voos et al. | |
| 2005/0128196 A1 | 6/2005 | Popescu et al. | |
| 2005/0182518 A1 | 8/2005 | Karlsson | |
| 2005/0231425 A1 | 10/2005 | Coleman et al. | |
| 2005/0238200 A1 | 10/2005 | Gupta et al. | |
| 2006/0015247 A1 | 1/2006 | Speer | |
| 2006/0049930 A1 | 3/2006 | Zruya et al. | |
| 2006/0058931 A1 | 3/2006 | Ariyur et al. | |
| 2006/0106506 A1 * | 5/2006 | Nichols | G05D 1/106 701/3 |
| 2006/0147088 A1 | 7/2006 | Han et al. | |
| 2006/0149472 A1 | 7/2006 | Han et al. | |
| 2006/0197937 A1 | 9/2006 | Bamji et al. | |
| 2006/0222207 A1 | 10/2006 | Balzer et al. | |
| 2006/0235610 A1 | 10/2006 | Ariyur et al. | |
| 2007/0018052 A1 | 1/2007 | Eriksson | |
| 2007/0093945 A1 | 4/2007 | Grzywna et al. | |
| 2007/0106473 A1 | 5/2007 | Bodin et al. | |
| 2007/0156286 A1 | 7/2007 | Yamauchi | |
| 2007/0171042 A1 * | 7/2007 | Metes | G08B 13/19621 340/539.22 |
| 2007/0193798 A1 | 8/2007 | Allard et al. | |
| 2007/0252748 A1 | 11/2007 | Rees et al. | |
| 2007/0257831 A1 | 11/2007 | Mathews et al. | |
| 2007/0280528 A1 | 12/2007 | Wellington et al. | |
| 2008/0009965 A1 | 1/2008 | Bruemmer et al. | |
| 2008/0027591 A1 * | 1/2008 | Lenser | G06F 3/0412 701/28 |
| 2008/0033645 A1 | 2/2008 | Levinson et al. | |
| 2008/0059015 A1 | 3/2008 | Whittaker et al. | |
| 2008/0059065 A1 | 3/2008 | Strelow et al. | |
| 2008/0154490 A1 | 6/2008 | Hoofd et al. | |
| 2008/0195304 A1 | 8/2008 | Krishnaswamy | |
| 2008/0195316 A1 | 8/2008 | Krishnaswamy | |
| 2008/0215204 A1 | 9/2008 | Roy et al. | |
| 2009/0027253 A1 * | 1/2009 | van Tooren | G08G 5/006 342/29 |
| 2009/0157233 A1 | 6/2009 | Kokkeby et al. | |
| 2009/0167761 A1 | 7/2009 | Hayashi et al. | |
| 2009/0177398 A1 | 8/2009 | Aiko et al. | |
| 2009/0210109 A1 | 8/2009 | Ravenscroft | |
| 2009/0213240 A1 | 8/2009 | Sim et al. | |
| 2009/0234499 A1 | 9/2009 | Nielsen et al. | |
| 2009/0248304 A1 | 10/2009 | Roumeliotis et al. | |
| 2010/0001902 A1 | 1/2010 | Smith | |
| 2010/0004798 A1 | 1/2010 | Bodin et al. | |
| 2010/0017115 A1 | 1/2010 | Gautama | |
| 2010/0030470 A1 | 2/2010 | Wang et al. | |
| 2010/0040279 A1 | 2/2010 | Yoon et al. | |
| 2010/0063651 A1 | 3/2010 | Anderson | |
| 2010/0084513 A1 | 4/2010 | Gariepy et al. | |
| 2010/0100269 A1 | 4/2010 | Ekhaguere et al. | |
| 2010/0109945 A1 | 5/2010 | Roh | |
| 2010/0198514 A1 | 8/2010 | Miralles | |
| 2010/0250022 A1 | 9/2010 | Hines et al. | |

(56) References Cited

U.S. PATENT DOCUMENTS

| | | |
|---|---|---|
| 2010/0250133 A1 | 9/2010 | Buros |
| 2010/0256909 A1 | 10/2010 | Duggan et al. |
| 2010/0265126 A1 | 10/2010 | Mao |
| 2010/0280699 A1 | 11/2010 | Bageshwar et al. |
| 2010/0303340 A1 | 12/2010 | Abraham et al. |
| 2010/0304070 A1 | 12/2010 | Meles |
| 2010/0305778 A1 | 12/2010 | Dorneich et al. |
| 2010/0312917 A1 | 12/2010 | Allport |
| 2011/0054689 A1 | 3/2011 | Nielsen et al. |
| 2011/0084162 A1 | 4/2011 | Goossen et al. |
| 2011/0106339 A1* | 5/2011 | Phillips ............... G05D 1/0274 701/2 |
| 2011/0123135 A1 | 5/2011 | Hsieh et al. |
| 2011/0147515 A1 | 6/2011 | Miller et al. |
| 2011/0178658 A1* | 7/2011 | Kotaba ................ G06T 7/254 701/472 |
| 2011/0178669 A1 | 7/2011 | Tanaka et al. |
| 2011/0246015 A1 | 10/2011 | Cummings et al. |
| 2011/0264427 A1 | 10/2011 | Shumaker et al. |
| 2011/0282523 A1 | 11/2011 | Shue |
| 2011/0282622 A1 | 11/2011 | Canter |
| 2012/0078510 A1 | 3/2012 | Ma et al. |
| 2012/0083945 A1 | 4/2012 | Oakley et al. |
| 2012/0106800 A1 | 5/2012 | Khan et al. |
| 2012/0127030 A1 | 5/2012 | Arthur et al. |
| 2012/0154277 A1 | 6/2012 | Bar-Zeev et al. |
| 2012/0203450 A1 | 8/2012 | Meyer et al. |
| 2012/0213436 A1 | 8/2012 | Grindstaff et al. |
| 2012/0237085 A1 | 9/2012 | Meier |
| 2012/0245844 A1 | 9/2012 | Lommel et al. |
| 2012/0281503 A1 | 11/2012 | Rikoski |
| 2012/0290146 A1 | 11/2012 | Dedes et al. |
| 2013/0009950 A1 | 1/2013 | Ben-David et al. |
| 2013/0050180 A1 | 2/2013 | Bruemmer |
| 2013/0135707 A1 | 5/2013 | Lopez et al. |
| 2013/0231779 A1 | 9/2013 | Purkayastha et al. |
| 2013/0308822 A1 | 11/2013 | Marimon et al. |
| 2013/0338856 A1 | 12/2013 | Yelland et al. |
| 2014/0032013 A1 | 1/2014 | Riley |
| 2014/0032034 A1 | 1/2014 | Raptopoulos et al. |
| 2014/0056438 A1 | 2/2014 | Baalu et al. |
| 2014/0163781 A1* | 6/2014 | Vian ................ G01S 7/4802 701/3 |
| 2014/0222248 A1* | 8/2014 | Levien ............... G05D 1/104 701/2 |
| 2014/0249693 A1* | 9/2014 | Stark ................ B64D 47/02 701/2 |
| 2014/0277854 A1* | 9/2014 | Jones ................ G06Q 30/0267 701/1 |
| 2014/0350839 A1* | 11/2014 | Pack ................ G05D 1/0231 901/1 |
| 2015/0128823 A1* | 5/2015 | Akcasu ............... F42B 10/56 102/501 |
| 2015/0148988 A1* | 5/2015 | Fleck ................ B64D 1/14 701/2 |
| 2015/0160658 A1 | 6/2015 | Reedman et al. |
| 2015/0212391 A1* | 7/2015 | Waibel ................ H04N 23/50 701/2 |
| 2015/0269438 A1* | 9/2015 | Samarasekera .... G01C 21/3848 382/154 |
| 2015/0350614 A1* | 12/2015 | Meier ................ G05D 1/0094 348/144 |
| 2015/0379874 A1* | 12/2015 | Ubhi ................ H04B 7/18506 701/3 |
| 2016/0068267 A1* | 3/2016 | Liu ................ G05D 1/0088 701/4 |
| 2016/0070264 A1* | 3/2016 | Hu ................ G05D 1/0011 701/2 |
| 2016/0070265 A1* | 3/2016 | Liu ................ B64C 39/024 701/25 |
| 2016/0137293 A1* | 5/2016 | Santangelo ........... B64C 39/024 244/50 |
| 2016/0187885 A1 | 6/2016 | Pack et al. |
| 2016/0189548 A1 | 6/2016 | Thurling et al. |
| 2016/0216710 A1 | 7/2016 | Hu et al. |
| 2016/0217698 A1 | 7/2016 | Liu et al. |
| 2016/0225264 A1* | 8/2016 | Taveira ................ H04W 48/04 |
| 2016/0273921 A1* | 9/2016 | Zhou ................ G01C 21/1656 |
| 2016/0273922 A1* | 9/2016 | Stefan ................ G06Q 10/047 |
| 2017/0045886 A1 | 2/2017 | Liu et al. |
| 2017/0052541 A1 | 2/2017 | Hu et al. |
| 2020/0142410 A1* | 5/2020 | Liu ........ G05D 1/102 |
| 2021/0247764 A1* | 8/2021 | Liu ........ G05D 1/102 |
| 2021/0343165 A1 | 11/2021 | Baumgart et al. |

FOREIGN PATENT DOCUMENTS

| | | |
|---|---|---|
| CN | 101445156 A | 6/2009 |
| CN | 201331348 Y | 10/2009 |
| CN | 201331349 A | 10/2009 |
| CN | 101650891 A | 2/2010 |
| CN | 101667036 A | 3/2010 |
| CN | 101762805 A | 6/2010 |
| CN | 101802738 A | 8/2010 |
| CN | 101867868 A | 10/2010 |
| CN | 101950027 A | 1/2011 |
| CN | 101952737 A | 1/2011 |
| CN | 102023003 A | 4/2011 |
| CN | 102362141 A | 2/2012 |
| CN | 102393747 A | 3/2012 |
| CN | 102460074 A | 5/2012 |
| CN | 102621987 A | 8/2012 |
| CN | 102707724 A | 10/2012 |
| CN | 102722178 A | 10/2012 |
| CN | 102749927 A | 10/2012 |
| CN | 102854887 A | 1/2013 |
| CN | 202815124 U | 3/2013 |
| CN | 103057712 A | 4/2013 |
| CN | 103116360 A | 5/2013 |
| CN | 202939489 U | 5/2013 |
| CN | 203038112 U | 7/2013 |
| CN | 103256931 A | 8/2013 |
| CN | 103323002 A | 9/2013 |
| CN | 103365299 A | 10/2013 |
| CN | 203397214 U | 1/2014 |
| CN | 203397215 A | 1/2014 |
| CN | 103576690 A | 2/2014 |
| CN | 103744430 A | 4/2014 |
| CN | 103809597 A | 5/2014 |
| CN | 103900583 A | 7/2014 |
| CN | 103901892 A | 7/2014 |
| CN | 103914077 A | 7/2014 |
| CN | 103925920 A | 7/2014 |
| CN | 103941747 A | 7/2014 |
| CN | 103941748 A | 7/2014 |
| CN | 103941750 A | 7/2014 |
| CN | 103970143 A | 8/2014 |
| CN | 103984357 A | 8/2014 |
| CN | 104115082 A | 10/2014 |
| DE | 1456162 A1 | 6/1969 |
| EP | 0588360 A1 | 3/1994 |
| EP | 2177966 A2 | 4/2010 |
| EP | 2515147 A2 | 10/2012 |
| EP | 2592436 A2 | 5/2013 |
| JP | H02241421 A | 9/1990 |
| JP | H08241123 A | 9/1996 |
| JP | H08273100 A | 10/1996 |
| JP | H11282530 A | 10/1999 |
| JP | 2003127994 A | 5/2003 |
| JP | 2004130852 A | 4/2004 |
| JP | 2008304260 A | 12/2008 |
| JP | 2009031884 A | 2/2009 |
| JP | 2009041932 A | 2/2009 |
| JP | 2010095246 A | 4/2010 |
| JP | 2010095247 A | 4/2010 |
| JP | 2011150512 A | 8/2011 |
| JP | 4852688 B2 | 1/2012 |
| JP | 2012140101 A | 7/2012 |
| JP | 2012242967 A | 12/2012 |
| JP | 2014002603 A | 1/2014 |
| JP | 2014002604 A | 1/2014 |
| JP | 2014041601 A | 3/2014 |

(56) References Cited

FOREIGN PATENT DOCUMENTS

| WO | 2003004352 A1 | 10/2004 |
|---|---|---|
| WO | 2009091431 A1 | 7/2009 |
| WO | 2009118043 A1 | 10/2009 |
| WO | 2011120141 A1 | 10/2011 |
| WO | 2013163746 A1 | 11/2013 |
| WO | 2014108026 A1 | 7/2014 |

OTHER PUBLICATIONS

Gon Woo Kim et al: "Hierarchical Sensor Fusion for Building an Occupancy Grid Map using Active Sensor Modules", SICE-ICCAS 2006 International Joint Conference, IEEE, Piscataway, Nu, USA, Oct. 1, 2006.
Fengchun Zhu, Research on Navigation and Environment Modeling of Mobile Robot, Dissertation of Doctor of Philosophy, College of Information and Electrical Engineering, Shandong University of Science and Technology, May 2007, 150 pages.
Parra, et al. Visual odometry and map fusion for GPS navigation assistance. In Industrial Electronics (ISIE), Jun. 2011 IEEE International Symposium on (pp. 832-837). IEEE.
The World Intellectual Property Organization (WIPO) International Search Report and Written Opinion for PCT/CN2014/086006 dated May 29, 2015.
The World Intellectual Property Organization (WIPO) International Search Report and Written Opinion for PCT/CN2014/086007 dated Jun. 10, 2015.
United States Patent and Trademark Office (USPTO) Office Action for U.S. Appl. No. 14/801,640 dated Oct. 28, 2015.
United States Patent and Trademark Office (USPTO) Office Action for U.S. Appl. No. 14/801,599 dated Nov. 17, 2016.
Krajnik et al., AR-Drone as a Platform for Robotic Research and Education, In Proc. International Conference of Research and Education in Robotics—EUROBOT 2011, Prague, Czech Republic, Jun. 2011, pp. 172-186.
The European Patent Office (EPO) EP Search Report and Search Opinion 14901421.9 dated Mar. 20, 2017.
United States Patent and Trademark Office (USPTO) Notice of Allowance for U.S. Appl. No. 14/801,599 dated Dec. 1, 2016.
United States Patent and Trademark Office (USPTO) Notice of Allowance for U.S. Appl. No. 14/801,640 dated Dec. 2, 2016.
United States Patent and Trademark Office (USPTO) Notice of Allowance for U.S. Appl. No. 15/088,645 dated Dec. 9, 2016.
Masone, et al., Semi-autonomous Trajectory Generation for Mobile Robots with Integral Haptic Shared Control, In Proc. 2014 IEEE Intl Conference on Robotics and Automation, pp. 6468-6475, Jun. 7, 2014.
United States Patent and Trademark Office (USPTO) Notice of Allowance for U.S. Appl. No. 14/801,640 dated May 24, 2016.
United States Patent and Trademark Office (USPTO) Notice of Allowance for U.S. Appl. No. 14/801,599 dated Jun. 27, 2016.
United States Patent and Trademark Office (USPTO) Notice of Allowance for U.S. Appl. No. 14/801,640 dated Jul. 13, 2016.
United States Patent and Trademark Office (USPTO) Notice of Allowance for U.S. Appl. No. 15/088,645 dated Oct. 3, 2016.
United States Patent and Trademark Office (USPTO) Office Action for U.S. Appl. No. 14/845,894 dated May 16, 2016.
The European Patent Office (EPO) Extended European Search Report and Opinion 13828970 dated Aug. 3, 2016.
Soloviev, et al., Tight coupling of GPS, laser scanner, and inertial measurements for navigation in urban environments, 2008 IEEE/ION Position, Location and Navigation Symposium, IEEE, 2008. pp. 511-525.
United States Patent and Trademark Office (USPTO) Notice of Allowance for U.S. Appl. No. 15/088,551 dated Aug. 9, 2016.
Bills, et al., Autonomous MAV flight in indoor environments using single image perspective cues, 2011 IEEE International Conference on Robotics and Automation (ICRA), May 9-13, 2011, pp. 5776-5783.
The European Patent Office (EPO) European Search Report and Opinion 14889182 dated Jul. 6, 2016.
Serranoa, et al., Seamless indoor-outdoor navigation for unmanned multi-sensor aerial platforms, The International Archives of Photogrammetry, Remote Sensing and Spatial Information Sciences, Mar. 5, 2014.
United States Patent and Trademark Office (USPTO) Office Action for U.S. Appl. No. 15/088,645 dated Jun. 8, 2016.
Merchant, Image information needed for autonomous systems, Proc. SPIE 5807, Automatic Target Recognition XV, 261, May 23, 2005.
United States Patent and Trademark Office (USPTO) Office Action for U.S. Appl. No. 15/088,551 dated May 16, 2016.
Ross, et al., Multi-Sensor 3D Image Fusion and Interactive Search, Information Fusion, 2000, Fusion 2000. Proceedings of the Third International Conference on vol. 1, IEEE, 2000.
United States Patent and Trademark Office (USPTO) Notice of Allowance for U.S. Appl. No. 14/801,599 dated Mar. 22, 2016.
United States Patent and Trademark Office (USPTO) Notice of Allowance for U.S. Appl. No. 14/801,640 dated Mar. 28, 2016.
The European Patent Office (EPO) European Search Report—Partial for Application No. 13828970 dated Feb. 22, 2016.
The World Intellectual Property Organization (WIPO) International Search Report and Written Opinion PCT/CN2014/086005 dated May 26, 2015.
The World Intellectual Property Organization (WIPO) International Search Report and Written Opinion PCT/CN2013/088971 dated Sep. 15, 2014.
Sanfourche, et al., Perception for UAV: Vision-based navigation and environment modeling, Journal Aerospace Lab 4, 2012, pp. 1-19.
Thrun, et al., Integrating grid-based and topological maps for mobile robot navigation, In Proceedings of National Conference on Artificial Intelligence, Portland, Oregon, Aug. 1996, pp. 944-951.
Corke, et al., An Introduction to Inertial and Visual Sensing, The International Journal of Robotics Research 2007, pp. 519-535.
United States Patent and Trademark Office (USPTO) Notice of Allowance for U.S. Appl. No. 14/801,599 dated Feb. 28, 2017.
United States Patent and Trademark Office (USPTO) Notice of Allowance for U.S. Appl. No. 14/801,599 dated Jan. 6, 2017.
United States Patent and Trademark Office (USPTO) Notice of Allowance for U.S. Appl. No. 15/088,551 dated Jan. 20, 2017.
United States Patent and Trademark Office (USPTO) Notice of Allowance for U.S. Appl. No. 15/088,551 dated Jan. 26, 2017.
United States Patent and Trademark Office (USPTO) Notice of Allowance for U.S. Appl. No. 14/801,640 dated Feb. 10, 2017.
United States Patent and Trademark Office (USPTO) Notice of Allowance for U.S. Appl. No. 15/088,645 dated Feb. 10, 2017.
United States Patent and Trademark Office (USPTO) Office Action for U.S. Appl. No. 14/236,315 dated Dec. 21, 2016.
Evan Dill, et al., Seamless Indoor-Outdoor Navigation for Unmanned Multi-Sensor Aerial Platforms, In Position, Location and Navigation Symposium—PLANS 2014, 2014 IEEE/ION, pp. 1174-1182.
United States Patent and Trademark Office (USPTO) Office Action for U.S. Appl. No. 14/236,315 dated Jul. 27, 2017.
United States Patent and Trademark Office (USPTO) Office Action for U.S. Appl. No. 15/340,404 dated Jun. 21, 2017.
Huiyan Chen et al. Introduction to unmanned vehicles, Jul. 31, 2014, pp. 130-131 Beijing Institute of Technology Press.
Lei Cheng Mobile robot system and its coordination control, Mar. 31, 2014, pp. 135-140 Huazhong University of Technology Press.
Hui Wang, "Fundamentals of Photo grammetry", Aug. 31, 2013.
Shioiri et al., Collision Avoidance Control Law of Aircraft under Uncertain Information, Journal of Japan Aeronautical and Space Sciences, Aug. 2003, pp. 427-432, vol. 51, No. 595.
Yulin Zhang, Image Engineering: Image Understanding (III), Dec. 31, 2012, pp. 106, vol. 3, Tsinghua University, Beijing, China.
Yanmin Wang et al., Point Cloud Management Based on Depth Images, Dec. 31, 2013, pp. 9, Surveying and Mapping Press. China.

\* cited by examiner

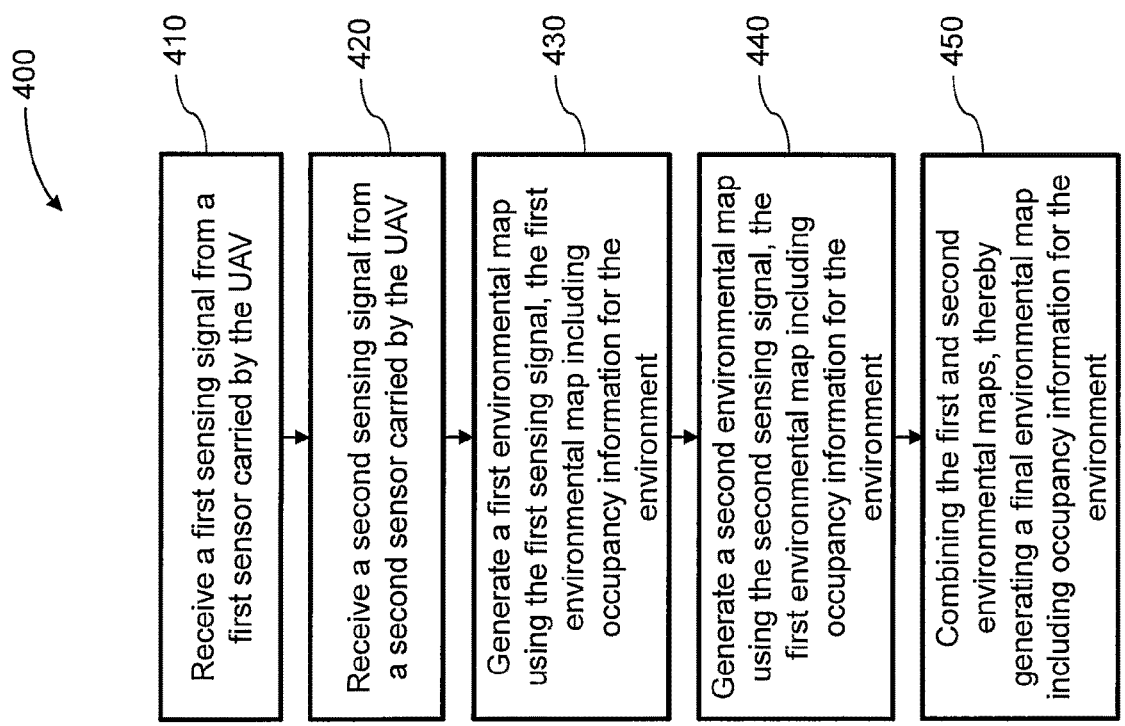

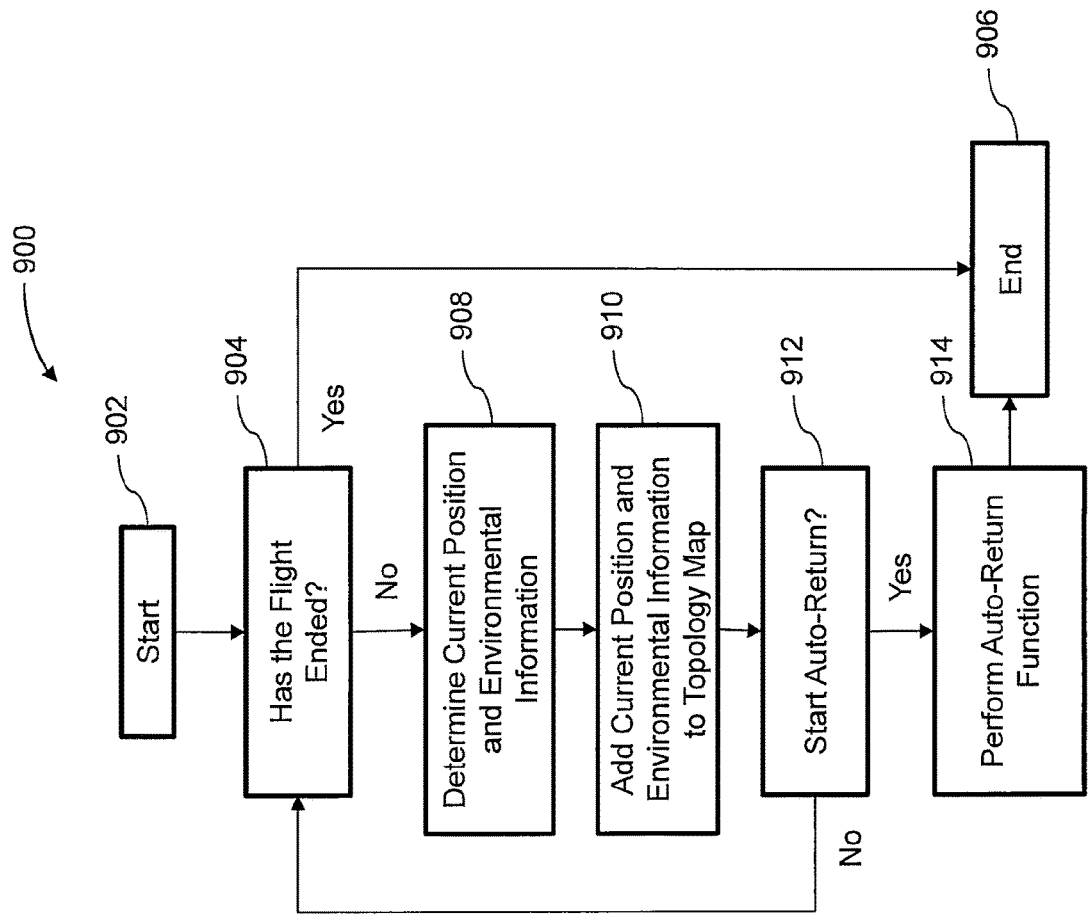

MULTI-SENSOR ENVIRONMENTAL MAPPING

CROSS-REFERENCE

This application is a continuation application of application Ser. No. 16/574,848, filed on Sep. 18, 2019, which is a continuation application of application Ser. No. 14/814,159, filed on Jul. 30, 2015, now U.S. Pat. No. 10,429,839, which is a continuation application of International Application No. PCT/CN2014/086007, filed on Sep. 5, 2014, the contents of all of which are hereby incorporated by reference in their entirety.

BACKGROUND

Unmanned vehicles such as unmanned aerial vehicles (UAVs) can be used for performing surveillance, reconnaissance, and exploration tasks in a wide variety of environments for military and civilian applications. A UAV may be manually controlled by a remote user, or may operate in a semi-autonomous or fully autonomous manner. Such UAVs can include sensors configured to collect data from the surrounding environment.

Existing approaches for obtaining environmental data may be less than optimal in some instances. For example, the accuracy of the environmental data may be limited based on the capabilities of the particular sensor type used to collect the data. Inaccurate environmental data may have a detrimental effect on UAV functions.

SUMMARY

Embodiments disclosed herein provide improved approaches for controlling movable objects such as UAVs within an environment. In many embodiments, a UAV includes a plurality of different sensor types used to collect information regarding the surrounding environment. The data obtained from each of the different sensor types can be combined in order to generate representations of the surrounding environment, such as a two-dimensional (2D) or three-dimensional (3D) environmental map, and also used to facilitate navigation, object recognition, and obstacle avoidance. Advantageously, the approaches described herein can be used to improve UAV functionality in diverse environment types and operating conditions.

Thus, in one aspect, a method for controlling a movable object within an environment is provided. The method comprises: determining, using at least one of a plurality of sensors carried by the movable object, an initial location of the movable object; generating a first signal to cause the movable object to navigate within the environment; receiving, using the at least one of the plurality of sensors, sensing data pertaining to the environment; generating, based on the sensing data, an environmental map representative of at least a portion of the environment; receiving an instruction to return to the initial location; and generating a second signal to cause the movable object to return to the initial location, based on the environmental map.

In some embodiments, the movable object is an unmanned aerial vehicle. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport. The unmanned aerial vehicle can be a multi-rotor aircraft.

In some embodiments, the environment may be an indoor environment or a low altitude environment.

In some embodiments, the plurality of sensors can comprise a global positioning system (GPS) sensor, a vision sensor, or a proximity sensor. The proximity sensor can comprise at least one of the following: a lidar sensor, an ultrasonic sensor, or a time-of-flight camera sensor. The plurality of sensors can comprise a plurality of different sensor types.

In some embodiments, the environmental map can comprises a topological map or a metric map. The metric map can comprise at least one of the following: a point cloud, a 3D grid map, a 2D grid map, or 2.5D grid map. Optionally, the metric map can comprise an occupancy grid map.

In some embodiments, generating the second signal comprises: determining, using at least one of the plurality of sensors, a current location of the movable object; determining, based on the environmental map, a path from the current location to the initial location; and generating a signal to cause the movable object to move along the path to return to the initial location. Determining the path can comprise determining a shortest path from the current location to the initial location. Alternatively or in combination, determining the path can comprise determining a path from the current location to the initial location that avoids one or more obstacles within the environment. The path can include one or more portions previously traveled by the movable object. The path can be different from a path previously traveled by the movable object. Optionally, the path may be a flight path of the movable object. The path can include spatial location and orientation of the movable object.

In some embodiments, the path comprises a plurality of waypoints corresponding to previously traveled positions of the movable object, the plurality of waypoints being recorded as the movable object navigates within the environment. The plurality of waypoints can be recorded in real time as the movable object navigates within the environment. Alternatively, the plurality of waypoints can be recorded at predetermined time intervals as the movable object navigates within the environment. The plurality of waypoints can be stored in a list data structure.

In some embodiments, generating the signal to cause the movable object to move along the path can comprise: detecting an obstacle in the environment situated along the path; modifying the path so as to avoid the obstacle; and generating a signal to cause the movable object to move along the modified path.

In another aspect, a system for controlling a movable object within the environment is provided. The system can comprise a plurality of sensors carried by the movable object and one or more processors. The one or more processors can be individually or collectively configured to: determine, using at least one of the plurality of sensors, an initial location of the movable object; generate a first signal that causes the movable object to navigate within the environment; receive, using the at least one of the plurality of sensors, sensing data pertaining to the environment; generate, based on the sensing data, an environmental map representative of at least a portion of the environment; receive an instruction to return to the initial location; and generate a second signal that causes the movable object to navigate to return to the initial location, based on the environmental map.

In another aspect, a method for controlling an unmanned aerial vehicle within an environment is provided. The method comprises: generating a first signal to cause the unmanned aerial vehicle to navigate within the environment; receiving, using a plurality of sensors carried by the unmanned aerial vehicle, sensing data pertaining to at least a portion of the; generating, based on the sensing data, an environmental map representative of at least the portion of the environment; detecting, using the environmental map, one or more obstacles situated in the portion of the environment; and generating, using the environmental map, a second signal to cause the unmanned aerial vehicle to navigate so as to avoid the one or more obstacles.

In some embodiments, the unmanned aerial vehicle is a rotorcraft. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport.

In some embodiments, the environment may be an indoor environment or a low altitude environment.

In some embodiments, the plurality of sensors can comprise a global positioning system (GPS) sensor, a vision sensor, or a proximity sensor. The proximity sensor can comprise at least one of the following: a lidar sensor, an ultrasonic sensor, or a time-of-flight camera sensor. The plurality of sensors can comprise a plurality of different sensor types. The sensing data can comprise data relative to a plurality of different coordinate systems and generating the environmental map comprises mapping the data onto a single coordinate system.

In some embodiments, the environmental map can comprises a topological map or a metric map. The metric map can comprise at least one of the following: a point cloud, a 3D grid map, a 2D grid map, or 2.5D grid map. Optionally, the metric map can comprise an occupancy grid map.

In some embodiments, the first signal is generated based on instructions are received from a remote terminal in communication with the unmanned aerial vehicle. The instructions can be input by a user into the remote terminal. Alternatively, the first signal can be generated autonomously by the unmanned aerial vehicle.

In some embodiments, the sensing data comprises data relative to a plurality of different coordinate systems and generating the environmental map comprises mapping the data onto a single coordinate system. Generating the first signal can comprise generating a flight path for the unmanned aerial vehicle, and generating the second signal can comprise modifying the flight path based on the environmental map so as to avoid the one or more obstacles. The flight path can be configured to direct the unmanned aerial vehicle from a current position to a previous position.

In another aspect, a system for controlling an unmanned aerial vehicle within an environment is provided. The system comprises a plurality of sensors carried by the unmanned aerial vehicle and one or more processors. The one or more processors can be individually or collectively configured to: generate a first signal to cause the unmanned aerial vehicle to navigate within the environment; receive, using a plurality of sensors carried by the unmanned aerial vehicle, sensing data pertaining to at least a portion of the environment; generate, based on the sensing data, an environmental map representative of at least the portion of the environment; detect, using the environmental map, one or more obstacles situated in the portion of the environment; and generate, using the environmental map, a second signal to cause the unmanned aerial vehicle to navigate so as to avoid the one or more obstacles.

In another aspect, a method for controlling an unmanned aerial vehicle within an environment is provided. The method comprises: receiving a first sensing signal pertaining to the environment from a first sensor and a second sensing signal pertaining to the environment from a second sensor, wherein the first and second sensors are of different sensor types, and wherein the first and second sensors are carried by an unmanned aerial vehicle; generating a first environmental map using the first sensing signal and a second environmental map using the second sensing signal, the first and second environmental maps each including obstacle occupancy information for the environment; and combining the first and second environmental maps, thereby generating a final environmental map including obstacle occupancy information for the environment.

In some embodiments, the method further comprises generating a signal to cause the unmanned aerial vehicle to navigate within the environment, based at least in part on the obstacle occupancy information in the final environmental map.

In some embodiments, the unmanned aerial vehicle is a rotorcraft. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport.

In some embodiments, the environment may be an indoor environment or a low altitude environment.

In some embodiments, the plurality of sensors can comprise a global positioning system (GPS) sensor, a vision sensor, or a proximity sensor. The proximity sensor can comprise at least one of the following: a lidar sensor, an ultrasonic sensor, or a time-of-flight camera sensor. The plurality of sensors can comprise a plurality of different sensor types.

In some embodiments, the environmental map can comprises a topological map or a metric map. The metric map can comprise at least one of the following: a point cloud, a 3D grid map, a 2D grid map, or 2.5D grid map. Optionally, the metric map can comprise an occupancy grid map.

In some embodiments, the first environmental map is provided relative to a first coordinate system and the second environmental map is provided relative to a second coordinate system different from the first coordinate system. The first coordinate system can be a global coordinate system and the second coordinate system can be a local coordinate system. Combining the first and second environmental maps can comprise converting the first and second environmental maps to a single coordinate system In some embodiments, the sensing range of the first sensor is different from the sensing range of the second sensor.

In another aspect, a system for controlling an unmanned aerial vehicle within an environment is provided. The system comprises: a first sensor carried by the unmanned aerial vehicle and configured to generate a first sensing signal pertaining to the environment; a second sensor carried by the unmanned aerial vehicle and configured to generate a second sensing signal pertaining to the environment, the second sensor and the first sensor being of different sensor types; and one or more processors. The one or more processors can be individually or collectively configured to: receive the first and second sensing signals; generate a first environmental map using the first sensing signal and a second environmental map using the second sensing signal, the first and second environmental maps each including obstacle occupancy information for the environment; and combine the first and second environmental maps, thereby generating a final environmental map including obstacle occupancy information for the environment.

In another aspect, a method for controlling an unmanned aerial vehicle within an environment is provided. The method comprises: determining, using at least one of a plurality of sensors carried by the unmanned aerial vehicle, an initial location of the unmanned aerial vehicle; generating a first signal to cause the unmanned aerial vehicle to navigate within the environment; receiving, using the at least one of the plurality of sensors, sensing data pertaining to the environment; receiving an instruction to return to the initial location; and generating a second signal to cause the unmanned aerial vehicle to return to the initial location along a path, wherein when the at least one of the plurality of sensors detects an obstacle in the environment situated along the path, the path is modified to avoid the obstacle.

In some embodiments, the unmanned aerial vehicle is a rotorcraft. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport.

In some embodiments, the environment may be an indoor environment or a low altitude environment.

In some embodiments, the plurality of sensors can comprise a global positioning system (GPS) sensor, a vision sensor, or a proximity sensor. The proximity sensor can comprise at least one of the following: a lidar sensor, an ultrasonic sensor, or a time-of-flight camera sensor. The plurality of sensors can comprise a plurality of different sensor types.

In some embodiments, the environmental map can comprises a topological map or a metric map. The metric map can comprise at least one of the following: a point cloud, a 3D grid map, a 2D grid map, or 2.5D grid map. Optionally, the metric map can comprise an occupancy grid map.

In some embodiments, the path includes one or more portions previously traveled by the movable object. The path can be different from a path previously traveled by the movable object. Optionally, the path may be a flight path of the movable object. The path can include spatial location and orientation of the movable object.

In another aspect, a system for controlling an unmanned aerial vehicle within an environment is provided. The system can include a plurality of sensors carried by the movable object and one or more processors. The one or more processors can be individually or collectively configured to: determine, using at least one of a plurality of sensors carried by the unmanned aerial vehicle, an initial location of the movable object; generate a first signal to cause the unmanned aerial vehicle to navigate within the environment; receive, using the at least one of the plurality of sensors, sensing data pertaining to the environment; receive an instruction to return to the initial location; and generate a second signal to cause the unmanned aerial vehicle to return to the initial location along a path, wherein when the at least one of the plurality of sensors detects an obstacle in the environment situated along the path, the path is modified to avoid the obstacle.

In another aspect, a method for generating a map of an environment is provided. The method comprises: receiving first sensing data from one or more vision sensors carried by an unmanned aerial vehicle, the first sensing data including depth information for the environment; receiving second sensing data from one or more proximity sensors carried by the unmanned aerial vehicle, the second sensing data including depth information for the environment; and generating an environmental map including depth information for the environment using the first and second sensing data.

In some embodiments, the first and second sensing data each comprise at least one image having a plurality of pixels, each pixel of the plurality of pixels associated with a two-dimensional image coordinate and a depth value. Each pixel of the plurality of pixels can be associated with a color value. The first and second sensing data can each comprise silhouette information for one or more objects in the environment.

In some embodiments, the method further comprises generating a signal to cause the unmanned aerial vehicle to navigate within the environment, based at least in part on the depth information in the environmental map.

In some embodiments, the unmanned aerial vehicle is a rotorcraft. The unmanned aerial vehicle may weigh no more than 10 kg. The maximum dimension of the unmanned aerial vehicle may be no more than 1.5 m. The unmanned aerial vehicle can be configured to fly at a height of no more than 400 m. Optionally, the unmanned aerial vehicle can be configured to detect the presence of a restricted flight region and not fly within a predetermined distance of the restricted flight region. The restricted flight region may be an airport.

In some embodiments, the environment may be an indoor environment or a low altitude environment.

In some embodiments, the one or more vision sensors comprise only one camera. Alternatively, the one or more vision sensors can comprise two or more cameras. The one or more proximity sensors can comprise at least one ultrasonic or at least one lidar sensor. The first sensing data can comprise a first set of depth images and the second sensing data can comprise a second set of depth images. Generating the environmental map can comprise: identifying a first plurality of feature points present in the first set of depth images; identifying a second plurality of feature points present in the second set of depth images, each of the second plurality of feature points corresponding to one of the first plurality of feature points; determining a correspondence between the first and second pluralities of feature points; and generating the environmental map by combining the first and second set of depth images based on the correspondence.

In some embodiments, the first sensing data is provided relative to a first coordinate system and the second sensing data is provided relative to a second coordinate system different from the first coordinate system. Generating the environmental map can comprise expressing the first and second sensing data relative to a third coordinate system. The third coordinate system can be either the first coordinate system or the second coordinate system. Alternatively, the third coordinate system can be different from the first coordinate system and the second coordinate system.

In some embodiments, the environmental map can comprises a topological map or a metric map. The metric map can comprise at least one of the following: a point cloud, a 3D grid map, a 2D grid map, or 2.5D grid map. Optionally, the metric map can comprise an occupancy grid map.

In another aspect, a system for generating a map of an environment is provided. The system can comprise: one or more vision sensors carried by an unmanned aerial vehicle and configured to generate first sensing data including depth information for the environment; one or more proximity sensors carried by the unmanned aerial vehicle and configured to generate second sensing data including depth information for the environment; and one or more processors. The one or more processors can be individually or collectively configured to: receive the first and second sensing data; and generate an environmental map including depth information for the environment using the first and second sensing data.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 4 illustrates a method for environmental mapping using different sensor types, in accordance with embodiments;

FIGS. 9A and 9B illustrate an algorithm for controlling a UAV to return to a target location using a topology map, in accordance with embodiments;

DETAILED DESCRIPTION

Figure 1A:
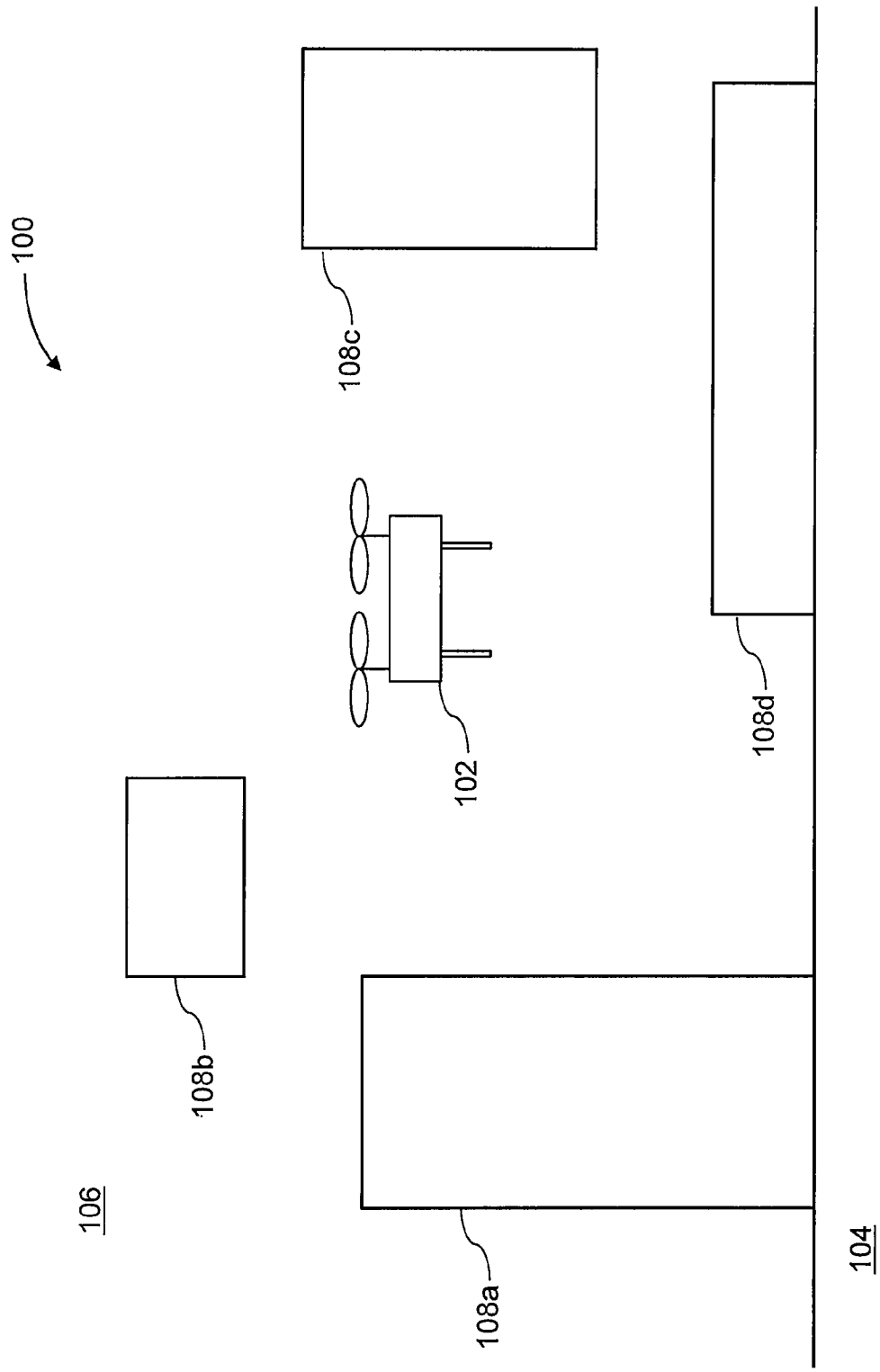
FIG. 1A illustrates a UAV operating in an outdoor environment, in accordance with embodiments.

The present disclosure provides systems and methods for controlling movable objects such as an unmanned aerial vehicle (UAV). In some embodiments, the UAV can be adapted to carry a plurality of sensors configured to collect environmental data. Some of the sensors may be of different types (e.g., a vision sensor used in combination with a proximity sensor). The data obtained by the plurality of sensors can be combined to generate an environmental map representative of the surrounding environment. In some embodiments, the environmental map can include information regarding the location of objects in the environment, such as objects or obstacles. The UAV can use the generated map to perform various operations, some of which may be semi-automated or fully automated. For instance, in some embodiments, the environmental map can be used to automatically determine a flight path for the UAV to navigate from its current location to a target location. As another example, the environmental map can be used to determine the spatial disposition of one or more obstacles and thereby enable the UAV to perform obstacle avoidance maneuvers. Advantageously, the use of multiple sensor types for collecting environmental data as disclosed herein can improve the accuracy of environmental mapping even in diverse environments and operating conditions, thereby enhancing the robustness and flexibility of UAV functionalities such as navigation and obstacle avoidance.

The embodiments provided herein can be applied to various types of UAVs. For instance, the UAV may be a small-scale UAV that weighs no more than 10 kg and/or has a maximum dimension of no more than 1.5 m. In some embodiments, the UAV may be a rotorcraft, such as a multi-rotor aircraft that is propelled to move through the air by a plurality of propellers (e.g., a quadcopter). Additional examples of UAVs and other movable objects suitable for use with the embodiments presented herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., an airport) and not fly within a predetermined distance of the restricted flight region, thereby averting potential collisions with aircraft and other obstacles.

Turning now the drawings, FIG. 1A illustrates a UAV 102 operating in an outdoor environment 100, in accordance with embodiments. The outdoor environment 100 may be an urban, suburban, or rural setting, or any other environment that is not at least partially within a building. The UAV 102 may be operated relatively close to the ground 104 (e.g., low altitude) or relatively far from the ground 104 (e.g., high altitude). For example, a UAV 102 operating less than or equal to approximately 10 m from the ground may be considered to be at low altitude, while a UAV 102 operating at greater than or equal to approximately 10 m from the ground may be considered to be at high altitude.

In some embodiments, the outdoor environment 100 includes one or more obstacles 108*a-d*. An obstacle may include any object or entity that may obstruct the movement of the UAV 102. Some obstacles may be situated on the ground 104 (e.g., obstacles 108*a*, 108*d*), such as buildings, ground vehicles (e.g., cars, motorcycles, trucks, bicycles), human beings, animals, plants (e.g., trees, bushes), and other manmade or natural structures. Some obstacles may be in contact with and/or supported by the ground 104, water, manmade structures, or natural structures. Alternatively, some obstacles may be wholly located in the air 106 (e.g., obstacles 108*b*, 108*c*), including aerial vehicles (e.g., airplanes, helicopters, hot air balloons, other UAVs) or birds. Aerial obstacles may not be supported by the ground 104, or by water, or by any natural or manmade structures. An obstacle located on the ground 104 may include portions that extend substantially into the air 106 (e.g., tall structures such as towers, skyscrapers, lamp posts, radio towers, power lines, trees, etc.).

Figure 1B:
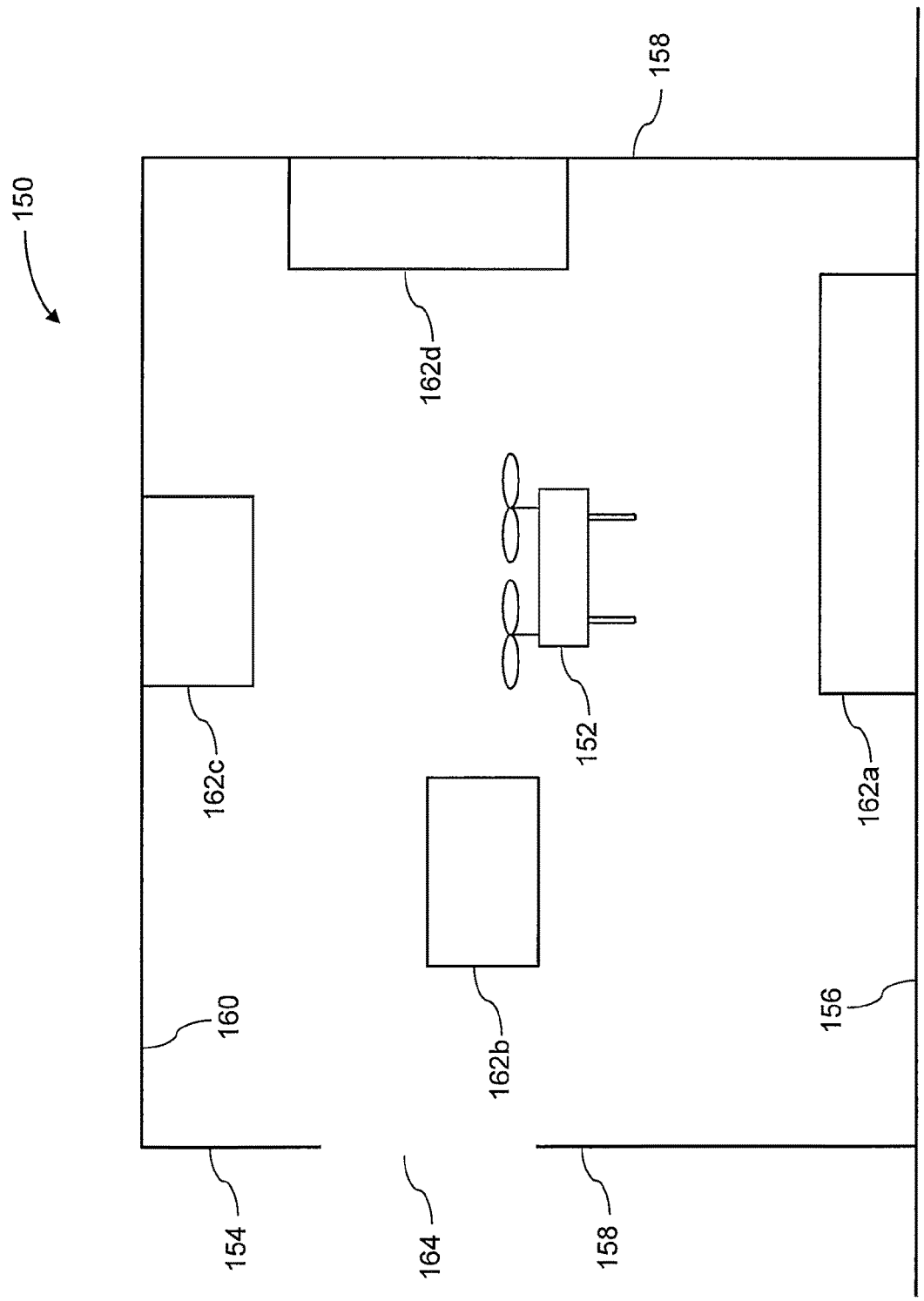
FIG. 1B illustrates a UAV operating in an indoor environment, in accordance with embodiments.

FIG. 1B illustrates a UAV 152 operating in an indoor environment 150, in accordance with embodiments. The indoor environment 150 is within the interior of a building 154 having a floor 156, one or more walls 158, and/or a ceiling or roof 160. Exemplary buildings include residential, commercial, or industrial buildings such as houses, apartments, offices, manufacturing facilities, storage facilities, and so on. The interior of the building 154 may be completely enclosed by the floor 156, walls 158, and ceiling 160 such that the UAV 152 is constrained to the interior space. Conversely, at least one of the floor 156, walls 158, or ceiling 160 may be absent, thereby enabling the UAV 152 to fly from inside to outside, or vice-versa. Alternatively or in combination, one or more apertures 164 may be formed in the floor 156, walls 158, or ceiling 160 (e.g., a door, window, skylight).

Similar to the outdoor environment 100, the indoor environment 150 can include one or more obstacles 162*a-d*. Some obstacles may be situated on the floor 156 (e.g., obstacle 162*a*), such as furniture, appliances, human beings, animals, plants, and other manmade or natural objects. Conversely, some obstacles may be located in the air (e.g., obstacle 162*b*), such as birds or other UAVs. Some obstacles in the indoor environment 150 can be supported by other structures or objects. Obstacles may also be attached to the ceiling 160 (e.g., obstacle 162*c*), such as light fixtures, ceiling fans, beams, or other ceiling-mounted appliances or structures. In some embodiments, obstacles may be attached to the walls 158 (e.g., obstacle 162*d*), such as light fixtures, shelves, cabinets, and other wall-mounted appliances or structures. Notably, the structural components of the building 154 can also be considered to be obstacles, including the floor 156, walls 158, and ceiling 160.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner.

In order to ensure safe and efficient operation, it may be beneficial to provide the UAV with mechanisms for detecting and identifying environmental objects such as obstacles. Additionally, recognition of environmental objects such as landmarks and features can facilitate navigation, particularly when the UAV is operating in a semi-autonomous or fully autonomous manner. Furthermore, knowledge of the UAV's precise location within the environment, as well as its spatial relationship to surrounding environmental objects, can be valuable for a wide variety of UAV functionalities.

Accordingly, the UAVs described herein can include one or more sensors configured to collect relevant data, such as information relating to the UAV state, the surrounding environment, or the objects within the environment. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The sensors described herein can be carried by the UAV. A sensor can be situated on any suitable portion of the UAV, such as above, underneath, on the side(s) of, or within a vehicle body of the UAV. Some sensors can be mechanically coupled to the UAV such that the spatial disposition and/or motion of the UAV correspond to the spatial disposition and/or motion of the sensors. The sensor can be coupled to the UAV via a rigid coupling, such that the sensor does not move relative to the portion of the UAV to which it is attached. Alternatively, the coupling between the sensor and the UAV can permit movement of the sensor relative to the UAV. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the UAV. Furthermore, the sensor can be electrically coupled with a portion of the UAV (e.g., processing unit, control system, data storage) so as to enable the data collected by the sensor to be used for various functions of the UAV (e.g., navigation, control, propulsion, communication with a user or other device, etc.), such as the embodiments discussed herein.

The sensors can be configured to collect various types of data, such as data relating to the UAV, the surrounding environment, or objects within the environment. For example, at least some of the sensors may be configured to provide data regarding a state of the UAV. The state information provided by a sensor can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translation acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system (e.g., relative to the UAV or another entity). For example, a sensor can be configured to determine the distance between the UAV and the user controlling the UAV, or the distance between the UAV and the starting point of flight for the UAV.

The data obtained by the sensors may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein. Obstacle information may include information regarding the number, density, geometry, and/or spatial disposition of obstacles in the environment.

In some embodiments, sensing results are generated by combining sensor data obtained by multiple sensors, also known as "sensor fusion." For instance, sensor fusion can be used to combine sensing data obtained by different sensor types, including as GPS sensors, inertial sensors, vision sensors, lidar, ultrasonic sensors, and so on. As another example, sensor fusion can be used to combine different types of sensing data, such as absolute measurement data (e.g., data provided relative to a global coordinate system such as GPS data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the final sensing result.

Figure 2A:
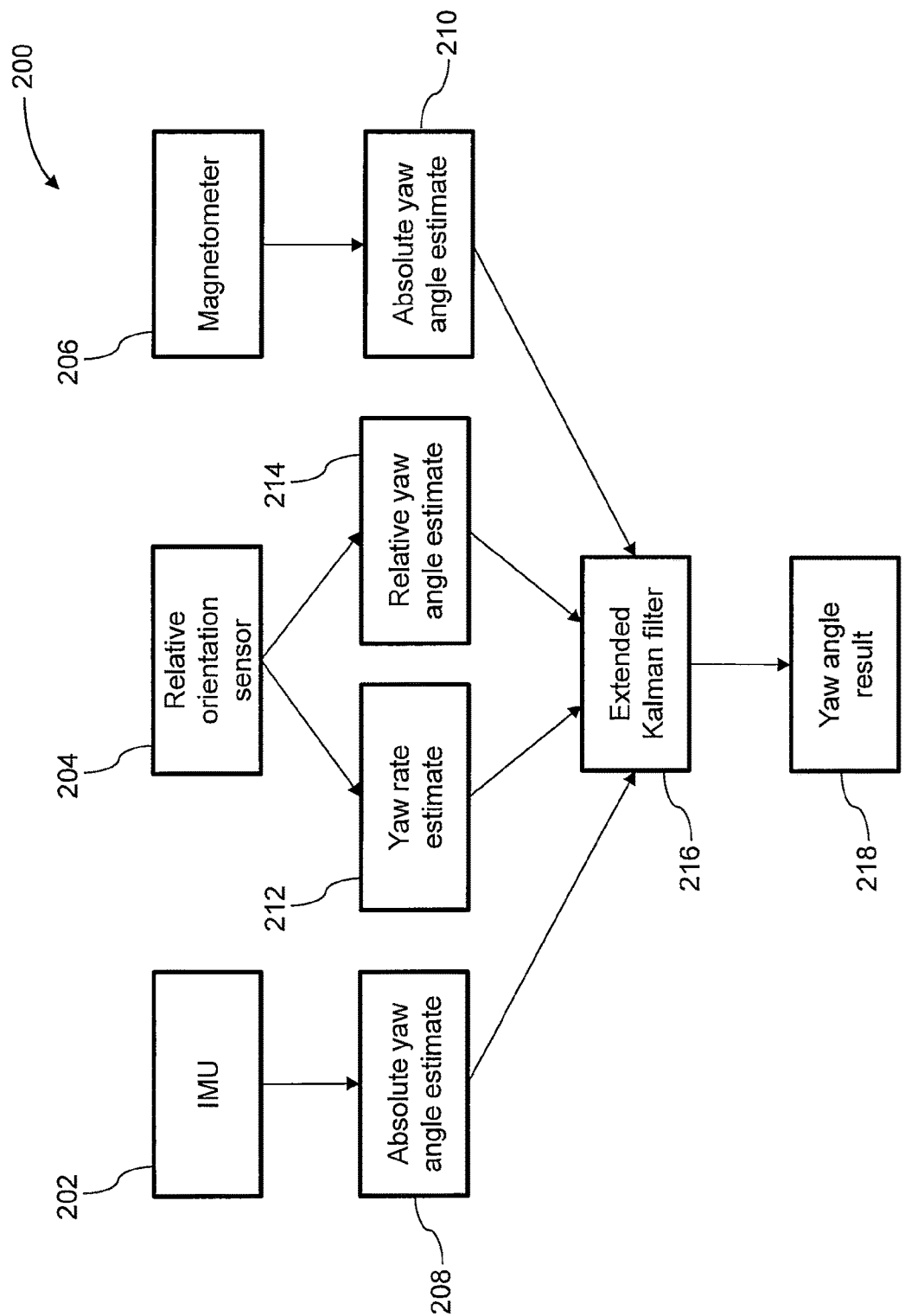
FIG. 2A illustrates a scheme for estimating UAV attitude using sensor fusion, in accordance with embodiments.

FIG. 2A illustrates a scheme 200 for estimating UAV attitude using sensor fusion, in accordance with many embodiments. Although the embodiment of FIG. 2A is directed to estimation of the UAV yaw angle, it shall be appreciated that the approach described in the scheme 200 can also be applied to estimation of the roll angle or pitch angle of the UAV. The scheme 200 utilizes an IMU 202, at least one relative orientation sensor 204, and a magnetometer 206. The IMU 202 and magnetometer 206 can be used to provide respective absolute estimates of the UAV yaw angle, 208, 210. The relative orientation sensor 204 can be any sensor that provides attitude information with respect to a local coordinate system (e.g., the UAV body coordinate system) rather than a global coordinate system. Exemplary relative orientation sensors include vision sensors, lidar, ultrasonic sensors, and time-of-flight or depth cameras. The relative orientation sensor data can be analyzed in order to provide an estimate of the yaw rate 212 and relative yaw angle 214.

In embodiments where the relative orientation sensor 204 is a vision sensor configured to capture a sequence of images ("frames"), the yaw rate 212 and yaw angle 214 can be determined using one or more images selected from the sequence ("keyframes"). Keyframes can be selected using any suitable method. For instance, keyframes can be selected at predetermined intervals, such as predetermined time intervals, predetermined distance intervals, predetermined displacement intervals, predetermined attitude intervals, or predetermined average disparity intervals between keyframes. As another example, keyframes can be selected based on the relationships between successive keyframes, e.g., the amount of overlapping area between keyframes. Optionally, keyframes can be selected based on combinations of the parameters provided herein. In some embodiments, at least some of the keyframes may include consecutive image frames. Alternatively, the keyframes may not include any consecutive image frames. The latter approach may be advantageous in terms of reducing the propagation of estimation errors present in consecutive keyframes.

The yaw rate 212 and yaw angle 214 at a given time can be estimated using any suitable number of keyframes, such as one, two, three, four, or more keyframes. The yaw rate 212 and yaw angle 214 can be determined using any suitable approach, such as image analysis. In some embodiments, it may be assumed that two keyframes that capture the same scene at different yaw angles will differ. The yaw angle between the differing keyframes can be determined by mathematical modeling techniques. For example, the difference between keyframes can be determined by identifying and matching feature points present in both keyframes. Based on the coordinates of the feature points in both keyframes, the similarity transformation matrix for the two keyframes can be determined, and the yaw angle 212 obtained from the similarity transformation matrix. The yaw rate 212 can then be calculated using the yaw angle 214 and the time interval between the two keyframes.

The absolute and relative estimates provided by the sensors 202, 204, 206 can be fused (e.g., using an extended Kalman filter 216 or other type of Kalman filter) in order to provide a final yaw angle result 218. Any suitable method can be implemented in order to fuse the estimates. For instance, the integral of yaw rate estimate 212 can be fused with the relative yaw angle estimate 214 in order to update the relative yaw angle estimate 214. The relative yaw angle estimate 214 can be fused with the absolute yaw angle estimates 208, 210 from the IMU 202 and magnetometer 206, respectively, to determine the yaw angle of the UAV. The final yaw angle result 218 can be provided as a relative yaw angle (e.g., relative to the body coordinate system of the UAV) or as an absolute yaw angle. As previously described, the combination of different types of measurement data may improve the accuracy of the final result 218. For example, in situations where the data provided by the magnetometer 206 is unsatisfactory (e.g., due to external magnetic fields), the use of data from the IMU 202 and/or the relative orientation sensor 204 can reduce the extent to which the magnetometer error influences the final result.

Figure 2B:
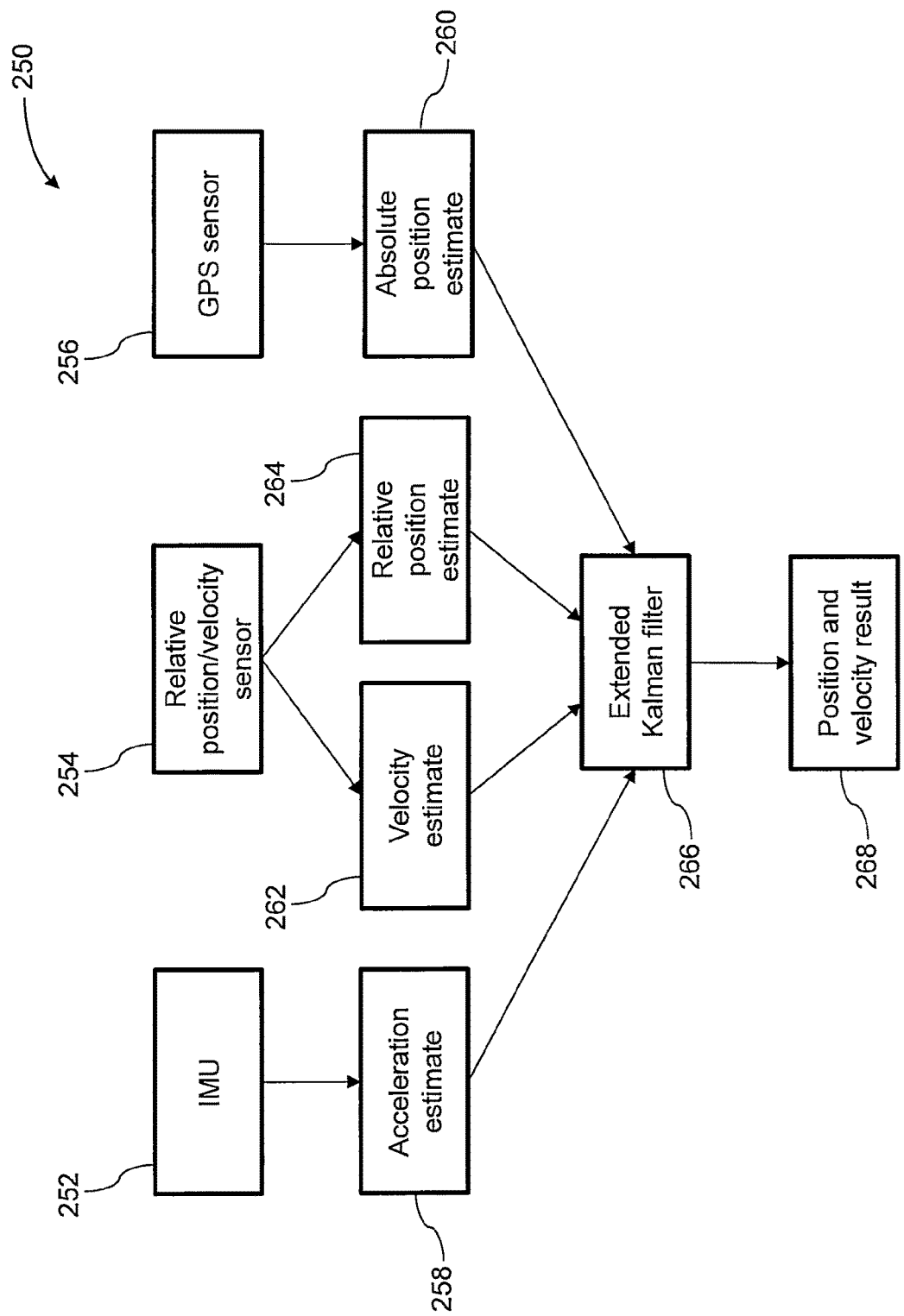
FIG. 2B illustrates a scheme for estimating UAV position and velocity using sensor fusion, in accordance with embodiments.

FIG. 2B illustrates a scheme 250 for estimating UAV position and velocity using sensor fusion, in accordance with embodiments. The scheme 250 utilizes an IMU 252, at least one relative position and/or velocity sensor 254, and a GPS sensor 256. The IMU 252 can provide an estimation of the UAV acceleration 258. The GPS sensor 256 can provide an estimation of the absolute position of the UAV 260. The relative position and/or velocity sensor 254 (e.g., vision sensor, lidar, ultrasonic sensor, time-of-flight or depth camera, or any other sensor that provides relative position and/or velocity information) can be used to obtain an estimation of the UAV velocity 262 and relative UAV position 264. Similar to the relative orientation sensor 204 of FIG. 2A, in embodiments where the relative position and/or velocity sensor 254 is a vision sensor, the velocity and relative position estimates 262, 264 can be determined based on one or more keyframes obtained by the vision sensor. For example, image analysis and mathematical modeling can be used to assess the differences between successive keyframes and thereby determine the translational movements of the UAV that would produce these differences. UAV velocity can then be estimated based on the time elapsed between keyframes.

The estimates provided by the sensors 252, 254, and 256 can be fused using an extended Kalman filter 266 or other suitable Kalman filter type, thereby obtaining a final position and velocity result 268 for the UAV. For instance, the integral of the acceleration estimate 258 can be fused with the UAV velocity estimate 262 in order to determine the UAV velocity. The integral of the determined UAV velocity can be fused with the relative position estimate 264 and absolute position estimate 260 in order to determine the UAV position. The position and velocity result 268 can be expressed relative to a local or global coordinate system.

Optionally, the sensor fusion with the Kalman filter 266 can also be used to determine calibration data for converting between the local coordinate system of the relative speed and/or position sensor 254 and the global coordinate system of the IMU 252 and GPS 256. The calibration data can be used to map absolute sensing data obtained by the IMU 252 and/or GPS 256 onto the relative sensing data obtained by the sensor 254, or vice-versa. For example, the IMU 252 and/or GPS 256 can be used to determine a path traveled by the UAV in absolute coordinates, and the relative sensor 254 can be used to obtain sensing data indicating a path traveled by the UAV in relative coordinates. The sensor fusion methods provided herein can be applied to determine the calibration parameters (e.g., scaling factor, rotation, translation) needed to project the absolute path data onto the relative path data, or vice-versa. For instance, the relationship between the calibration parameters, absolute path data, and relative path data can be represented by mathematical modeling. Absolute and relative path data obtained by the sensors can then be input into the model in order to solve for the calibration parameters. The combination of absolute and relative path data described herein can be used to enhance the accuracy of path determination, thereby improving UAV navigation.

The sensor fusion approaches described herein can be applied to provide more accurate estimates of the UAV state as well as environmental information. In some embodiments, estimation of UAV state information and environmental information may be mutually dependent, such that UAV state information is used to estimate environmental information, and vice-versa. For example, some sensors can be used to obtain absolute environmental information, $p_i^W$, while other sensors can be used to obtain relative environmental information, $p_i^B$. The absolute environmental information can be projected onto the relative environmental information (or vice-versa) based on the relation $Rp_i^W + T = p_i^B$, where R represents the rotation matrix between the global and local coordinate systems and T represents the translation vector from the origin of the global coordinate system to the origin of the local coordinate system. In some embodiments, $p_i^B$ is provided with respect to the body coordinate system of the UAV, such that T and R can be determined based on the UAV position and orientation, respectively. Accordingly, the UAV position and orientation information can be used to combine absolute and relative environmental data, thereby generating an estimate of the environmental information. Conversely, absolute and relative environmental data can be used to estimate the UAV position and orientation using the relation described above. This approach can be iterated in order to provide updated estimates of the UAV state and environmental information.

In some embodiments, sensor data can be used to generate a representation of the environment, or at least a portion thereof. Such representations may be referred to herein as "environmental maps." An environmental map may represent portions of the environment within the immediate proximity of the UAV (local map), or may also represent portions that are relatively far from the UAV (global map). For instance, a local map may represent portions of the environment within a radius of about 2 m, 5 m, 10 m, 15 m, 20 m, 25 m, or 50 m from the UAV. A global map may represent portions within a radius of about 25 m, 50 m, 75 m, 100 m, 125 m, 150 m, 200 m, 225 m, 250 m, 300 m, 400 m, 500 m, 1000 m, 2000 m, or 5000 m from the UAV. The size of the environmental map may be determined based on the effective range of the sensors used to generate the map. The effective range of a sensor may vary based on the sensor type. For instance, a vision sensor can be used to detect objects within a radius of about 10 m, 15 m, 20 m, or 25 m from the UAV. A lidar sensor can be used to detect objects within a radius of about 2 m, 5 m, 8 m, 10 m, or 15 m from the UAV. An ultrasonic sensor can be used to detect objects within a radius of about 2 m, 5 m, 8 m, 10 m, or 15 m from the UAV. In some embodiments, the environmental map may only represent portions that were previously traveled by the UAV. Alternatively, in other embodiments, the environmental map may also represent portions of the environment that have not been traveled by the UAV.

An environmental map can be used to represent various types of environmental information. For example, the map can provide information indicating the geometry (e.g., length, width, height, thickness, shape, surface area, volume), spatial disposition (e.g., position, orientation), and type of environmental objects such as obstacles, structures, landmarks, or features. As another example, the map can provide information indicating which portions of the environment are obstructed (e.g., cannot be traversed by the UAV) and which portions are unobstructed (e.g., can be traversed by the UAV). Furthermore, the map can provide information regarding the current location of the UAV and/or its spatial disposition relative to various environmental objects.

Any suitable type of environmental map can be used, such as a metric map or a topological map. A topological map may depict connectivity between locations within the environment, while a metric map may depict the geometry of objects within the environment. Optionally, an environmental map may include a combination of metric and topological information. For example, an environmental map can depict connectivity as well as absolute spatial relationships (e.g., distances) between environmental objects and/or locations. Alternatively or in combination, some portions of the map may be depicted topologically, while other portions may be depicted metrically.

The environmental map can be provided in any suitable format. For example, a topological environmental map can be provided as a graph having vertices representing locations and edges representing paths between the locations. The edges of a topological environmental map may be associated with distance information for the corresponding path. A metric environmental map can be any representation depicting spatial coordinates of environmental locations and objects, as a point cloud, topographical map, 2D grid map, 2.5D grid map, or 3D grid map. The spatial coordinates may be 3D coordinates (e.g., x, y, and z coordinates) representing the spatial location of points on the surfaces of environmental objects. In some embodiments, a metric environmental map can be an occupancy grid map. An occupancy grid map can represent the environment as a plurality of volumes. The volumes may be of equal sizes or of differing sizes. The occupancy grid map may indicate, for each volume, whether the volume is substantially occupied by an obstacle, thereby providing a precise representation of obstructed and unobstructed spaces within the environment.

The environmental maps described herein can be generated using any suitable method. For example, one or more portions of an environmental map can be generated during UAV operation (e.g., during flight), such as by using simultaneous localization and mapping (SLAM) or other robotic mapping techniques. Alternatively, one or more portions of the map can be generated prior to UAV operation and provided to the UAV prior to or during flight (e.g., transmitted from a remote computing system). Such maps may be modified based on data obtained by the UAV during flight, thereby providing additional refinement of the map data.

In some embodiments, environmental mapping can be performed using sensor fusion to combine environmental information collected by multiple sensor types. This approach may be advantageous in order to compensate for the limitations of individual sensor types. For example, GPS sensing data may be inaccurate or unavailable when the UAV is in an indoor environment. Vision sensors may not be optimized for detecting transparent objects (e.g., glass) or for relatively dark environments (e.g., nighttime). In some embodiments, lidar sensors may have a relatively short detection range compared to other sensor types. The use of multi-sensor fusion described herein can provide accurate mapping under diverse environment types and operating conditions, thus improving the robustness and flexibility of UAV operation.

Figure 3A:
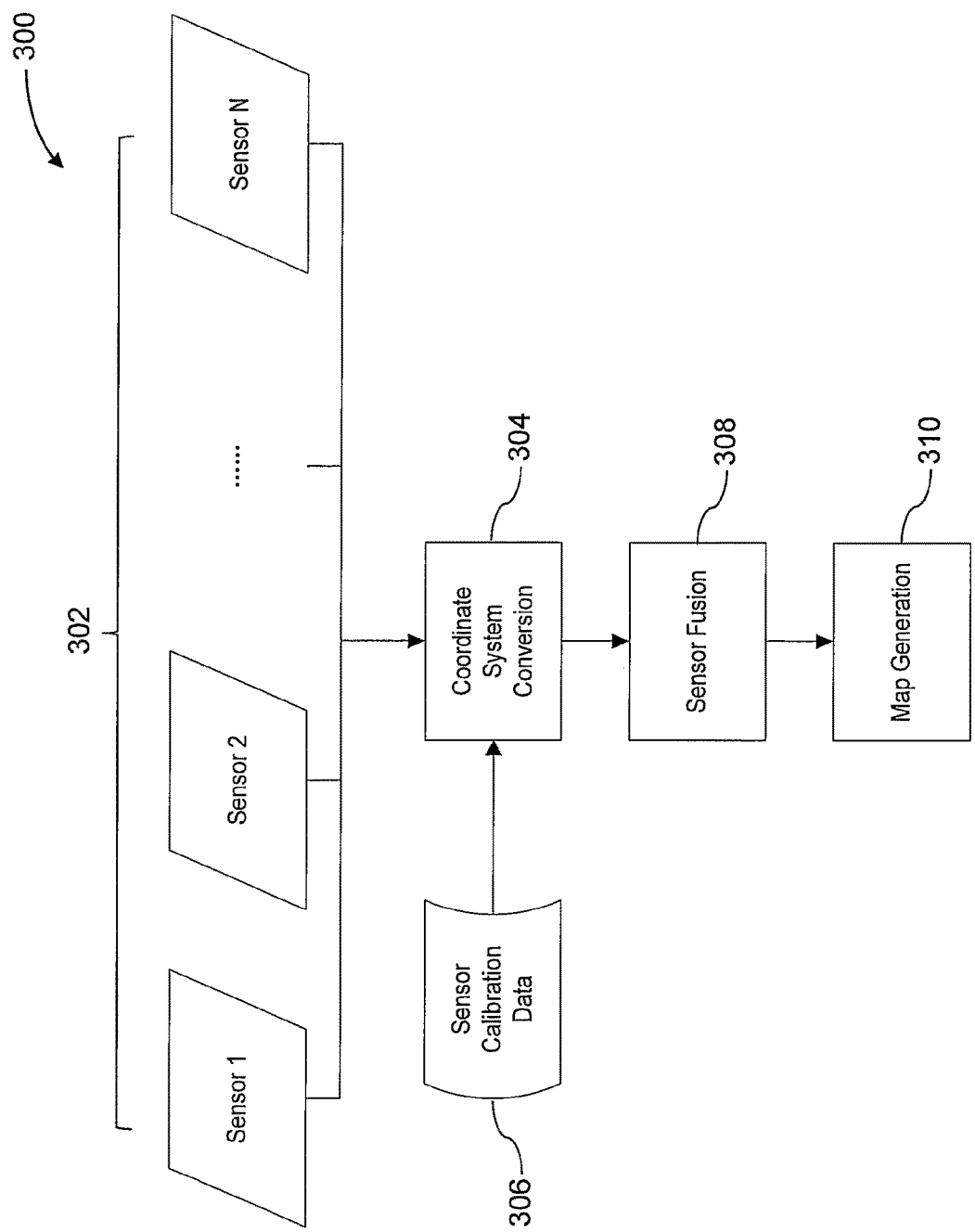
FIG. 3A illustrates a scheme for environmental mapping using sensor fusion, in accordance with embodiments.

FIG. 3A illustrates a scheme 300 for environmental mapping using sensor fusion, in accordance with embodiments. The scheme 300 can be used to generate any embodiment of the environmental maps described herein. In the scheme 300, sensing data is received from a plurality of sensors 302. The plurality of sensors 302 may include one or more different sensor types. The sensors 302 can be carried by a UAV, e.g., coupled to the vehicle body of the UAV. Optionally, the sensing data from each of the sensors 302 can be pre-processed to improve data quality by filtering, noise reduction, correction of image distortion, and so on. In some embodiments, the sensing data provided by each of the sensors 302 may be represented relative to a respective coordinate system (e.g., based on the position and orientation of the sensor relative to the vehicle body of the UAV). Accordingly, the sensing data from each sensor can be combined by converting all the sensing data into a single coordinate system 304. For example, sensing data provided relative to a local coordinate system may be converted into a global coordinate system, or vice-versa. The coordinate system conversion 304 can be accomplished based on sensor calibration data 306. Sensor calibration can be performed using any suitable technique, and can be performed prior to operation of the UAV (offline calibration) or during operation of the UAV (online calibration). In some embodiments, sensor calibration involves determining extrinsic parameters for the sensors 302, such as the spatial relationships (e.g., relative position and orientation) between each of the sensors 302. The conversion calculations for transforming the sensing data into a single coordinate system can then be determined based on the determined sensor parameters.

Following the coordinate system conversion 304, the converted sensing data can then be combined using sensor fusion 308 to obtain a single sensing result. Various techniques can be used to perform sensor fusion, such as Kalman filtering (e.g., Kalman filter, extended Kalman filter, unscented Kalman filter), particle filtering, or other filtering techniques known to those of skill in the art. The method used may vary depending on the specific combination and types of sensors used. In some embodiments, the sensor fusion 308 may utilize sensing data from all of the sensors 302. Conversely, the sensor fusion 308 may utilize data from only a subset of the sensors 302. The latter approach may be advantageous in order to omit inadequate or unreliable sensor data (e.g., GPS sensing data when the UAV is indoors). The fused sensing data can then be used for environmental map generation 310.

Environmental mapping can be performed based on sensing data from any suitable combination of sensors. For example, in some embodiments, the mapping methods described herein be implemented by a UAV carrying a lidar sensor and a vision sensor (e.g., a monocular vision sensor such as a single camera). The lidar sensor can be used to obtain distance data of environmental objects relative to the UAV, whereas the vision sensor can be used to capture image data of surrounding environmental objects. Sensor calibration data for the lidar and vision sensors can include sensor parameters indicative of the spatial relationship between the lidar and vision sensors. For instance, for an environmental object determined to be a distance $M_i$ from the UAV by the lidar sensor and corresponding to an object at coordinate $m_i$ in the image data captured by the vision sensor, the relationship between $m_i$ and $M_i$ can be represented by $$s_i m_i = K(R,t) M_i$$

where R is a rotation matrix, t is a transform matrix, $s_i$ is an unknown scalar, and K is the internal matrix for the vision sensor (an intrinsic parameter determined by prior calibration). In the above equation, $M_i$, $m_i$, and K are known, while R and t are unknown. If N number of measurements are taken, since R and t are constant (the relative position and orientation of the lidar sensor and vision sensor are fixed), the problem is thus a Perspective-n-Point (PNP) problem and can be solved using techniques known to those of skill in the art in order to obtain R and t, the sensor parameters.

Once the sensor calibration data has been obtained, the lidar sensing data and the vision sensing data can be converted into the same coordinate system ("world" coordinate system):

$$X^W = \{X_C^W, X_L^W, \ldots\} = \{(E,0)X_C^C, (R^{WL}, t^{WL})X_L^L, \ldots\}.$$

$X^W$ is the data relative to the world coordinate system (which corresponds to the vision sensor coordinate system in the present embodiment), $X_C^W$ is the vision sensing data relative to the world coordinate system, $X_C^C$ is the vision sensing data relative to the vision sensor coordinate system, $X_L^W$ is the lidar sensing data relative to the world coordinate system, $X_L^L$ is the lidar sensing data relative to the lidar sensor coordinate system, and $R^{WL}$ and $t^{WL}$ are the rotation and transformation matrices for converting between the vision sensor and lidar sensor coordinate systems (corresponding to R and t as described above). E is the diagonal matrix $$E = \begin{pmatrix} s & 0 & 0 & 0 \\ 0 & s & 0 & 0 \\ 0 & 0 & \ddots & 0 \\ 0 & 0 & 0 & s \end{pmatrix}$$

where s is an unknown scale factor.

The converted sensing data can then be combined using sensor fusion techniques. For instance, the relationship between the vision sensing data relative to the vision coordinate system $X_C^C$ and the vision sensing data relative to the world coordinate system $X_C^W$ can be represented by $$X_C^W = s X_C^C.$$

Using the lidar sensing data, the point nearest to the UAV (denoted as point i) along the sensing direction of the lidar sensor $(X_L^W)_i$ can be obtained. Accordingly, since $$(X_C^W)_i = (X_L^W)_i = s(X_C^C)_i$$

and $(X_L^W)_i$ and $(X_C^C)_i$ are known (since $X_L^W = (R^{WL}, t^{WL}) X_L^L$), the value of s can be determined. Accordingly, the local sensor data, $X_L^L$ and $X_C^C$, can be converted to respective world coordinates, $X_L^W$ and $X_C^W$ and fused to generate a single result, $X^W$. The fused data can then be used to generate a map of the environment surrounding the UAV.

Figure 3B:
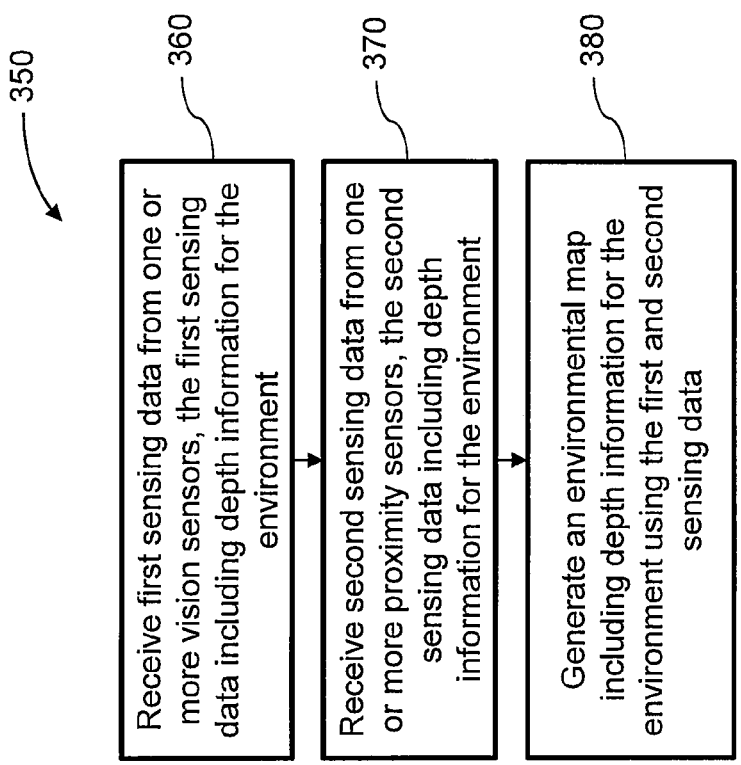
FIG. 3B illustrates a method for generating a map of an environment using sensor fusion, in accordance with embodiments.

FIG. 3B illustrates a method 350 for generating a map of an environment using sensor fusion, in accordance with embodiments. The method 350 can be performed by any of the systems and devices provided herein, such as by one or more processors of a UAV.

In step 360, first sensing data is received from one or more vision sensors, the first sensing data including depth information for the environment. For example, the vision sensor can include only one camera (monocular vision sensor). Alternatively, the vision sensor can include two (binocular vision sensor) or more cameras. The vision sensors can be carried by the UAV, such as by a UAV vehicle body. In embodiments where multiple vision sensors are used, each sensor can be located on a different portion of the UAV, and the disparity between the image data collected by each sensor can be used to provide depth information for the environment. Depth information can be used herein to refer to information regarding distances of one or more objects from the UAV and/or sensor. In embodiments where a single vision sensor is used, depth information can be obtained by capturing image data for a plurality of different positions and orientations of the vision sensor, and then using suitable image analysis techniques (e.g., structure from motion) to reconstruct the depth information.

In step 370, second sensing data is received from one or more proximity sensors, the second sensing data including depth information for the environment. The proximity sensors can include at least one ultrasonic sensor (e.g., a wide angle sensor, an array sensor) and/or at least one lidar sensor. In some embodiments, an ultrasonic array sensor may provide improved detection accuracy compared to other types of ultrasonic sensors. The proximity sensors can also be carried by the UAV. The proximity sensors can be located near the vision sensors. Alternatively, the proximity sensors can be situated on a portion of the UAV different from the portions used to carry the vision sensors.

In step 380, an environmental map including depth information for the environment is generating using the first and second sensing data. As described herein, the first and second sensing data can each include depth information for the environment. Optionally, the first and second sensing data can also include silhouette information for one or more objects in the environment. Silhouette information may be used herein to refer to information regarding the contours, outlines, or edges of an environmental object. The sensing data generated by the one or more proximity sensors can be provided as a pixel depth map, while depth information can be extracted from image data collected by the one or more vision sensors using techniques such as structure from motion, structured light, sheet of light, time-of-flight, or stereovision disparity mapping. In some embodiments, the first and second sensing data each comprise at least one image having a plurality of pixels, each pixel being associated with a 2D image coordinate (e.g., x and y coordinates), a depth value (e.g., distance between an environmental object corresponding to the pixel and the UAV and/or sensor), and/or a color value (e.g., a RGB color value). Such images may be referred to herein as depth images.

The depth information associated with each set of sensing data can be spatially aligned and combined (e.g., using suitable sensor fusion methods such as Kalman filtering) in order to generate a map including depth information (e.g., a 3D environmental representation such as an occupancy grid map), with consideration being given to the relative reliability and accuracy of each type of sensing data during the fusion process. In some embodiments, generation of the environmental map can involve identifying a plurality of feature points present in a set of depth images provided by the vision sensors, identifying a corresponding plurality of feature points present in a set of depth images provided by the proximity sensors, and determining a correspondence between both pluralities of feature points. The correspondence may include information regarding one or more transformations (e.g., translation, rotation, scaling) that can be applied to map the proximity depth images onto the vision depth images, or vice-versa. The depth images can then be combined based on this correspondence in order to generate the environmental map. Alternatively or in combination, the first and second sensing data may be provided relative to different coordinate systems, and the environmental map can be generated by expressing the first and second sensing data in the same coordinate system. This coordinate system may be the coordinate system associated with the first sensing data, the coordinate system associated with second sensing data, or an entirely different coordinate system. Once an environmental map has been generated, the UAV can be navigated within the environment based on the depth information included in the environmental map.

The combination of proximity and vision sensing described herein can compensate for the limitations of the individual sensor types, thereby improving the accuracy of map generation. For instance, vision sensors can produce relatively high resolution color images, but it may be relatively difficult to obtain accurate depth data from image data when a monocular camera is used or when the binocular camera distance is relatively small (as may occur when the cameras are installed on a small scale UAV). Additionally, vision sensors may not be able to provide satisfactory image data when the lighting is bright or has high contrast, or in adverse environmental conditions such as rain, fog, or smog. Conversely, proximity sensors such as ultrasonic sensors may provide accurate depth data, but may have a lower resolution compared to vision sensors. Also, in some instances, ultrasonic sensors and other proximity sensor types may not be able to detect objects with small reflective surfaces (e.g., twigs, corners, railings) or absorbent objects (e.g., carpeting), or may not be able to resolve distances in complex environments having many objects (e.g., indoor environments). However, vision sensing data may generally be complementary to proximity sensing data, in that the vision sensor is able to produce reliable data in conditions where the proximity sensor is generating less than optimal data, and vice-versa. Accordingly, the combined use of vision and proximity sensors can be used to generate accurate environmental maps in a wide variety of operating conditions and for diverse types of environments.

FIG. 4 illustrates a method 400 for environmental mapping using different sensor types, in accordance with embodiments. As with all methods disclosed herein, the method 400 can be practiced using any embodiment of the systems and devices presented herein, such as by one or more processors carried onboard the UAV. Additionally, as with all methods disclosed herein, any of the steps of the method 400 can be combined with or substituted for any of the steps of the other methods herein.

In step 410, a first sensing signal is received from a first sensor carried by the UAV. The first sensing signal can include information pertaining to the environment in which the UAV is operating, such as environmental data indicating the location and geometry of environmental objects (e.g., obstacles). Similarly, in step 420, a second signal is received from a second sensor carried by the UAV. In some embodiments, the first and second sensors can be of different sensor types, including any of the sensor types previously described herein (e.g., lidar and vision sensors, ultrasonic and vision sensors, etc.).

In step 430, a first environmental map is generated using the first sensing signal, the first environmental map including occupancy information for the environment. In step 440, a second environmental map is generated using the second sensing signal, the second environmental map including occupancy information for the environment. The first and second environmental maps can include obstacle occupancy information for the environment, respectively, so that the environmental map can be used to determine the locations of obstacles relative to the UAV. For example, the first and second environmental maps may be occupancy grid maps or any other map type including information regarding obstructed and unobstructed spaces within the environment.

Optionally, the first environmental map may represent a different portion of the environment than the second environmental map. For example, the first environmental map may represent a portion of the environment relatively close the UAV, while the second environmental map may represent a portion of the environment relatively far from the UAV. In some embodiments, different sensing signals can be used to generate maps spanning different portions of the environment. The selection of the signal to be used to generate the different maps can be based on any suitable criteria, such as the relative signal quality and/or accuracy of the first and second sensing signals for that particular portion of the environment. The quality and accuracy of sensing data may depend on the specific characteristics of each sensor, and may vary based on environment type (e.g., indoor, outdoor, low altitude, high altitude), weather conditions (e.g., clear, rainy, foggy), relative location of the sensed environmental objects (e.g., short range, long range), as well as the properties of the sensed environmental objects (e.g., transparency, reflectivity, absorbance, shape, size, material, mobility, etc.). For example, the first sensor may be more accurate than the second sensor at short ranges, while the second sensor may be more accurate than the first at long ranges. Accordingly, the first sensor can be used to generate a map for environment portions relatively close to the UAV, while the second sensor can be used to generate a map for environment portions relatively far from the UAV. Alternatively or in combination, the selection of the signal can be based on whether the environmental portion lies within the sensing range of the corresponding sensor. This approach may be advantageous in embodiment where the first and second sensors have different sensing ranges. For example, a short range sensor can be used to generate a map of environmental portions relatively close the UAV, while a long range sensor can be used to generate a map of the portions relatively far from the UAV that are outside the range of the short range sensor.

In step 450, the first and second environmental maps are combined, thereby generating a final environmental map including occupancy information for the environment. The environmental maps can be combined using the sensor fusion techniques described herein. In embodiments where the sensing signals are provided relative to different coordinate systems (e.g., a local coordinate system and a global coordinate system), the generation of the map portions can involve converting both sensing signals into a single coordinate system in order to align the respective environmental data, thereby producing a final environmental map. Subsequently, the UAV can be navigated within the environment based on the final environmental map. For instance, the UAV can be navigated based at least in part on obstacle occupancy information represented in the final environmental map in order to avoid collisions. The UAV can be navigated by a user, by an automated control system, or suitable combinations thereof. Additional examples of UAV navigation based on environmental map data are described in greater detail below.

Although the above steps show a method 400 of environmental mapping in accordance with embodiments, a person of ordinary skill in the art will recognize many variations based on the teaching described herein. Some of the steps may comprise sub-steps. In some embodiments, the steps of the method 400 can be repeated as desired (e.g., continuously or at predetermined time intervals) so that the resultant environmental map is updated and refined as the UAV navigates within the environment. This real-time mapping approach can enable the UAV to rapidly detect environmental objects and adapt to varying operating conditions.

The sensor fusion approaches described herein can be applied to various types of UAV functionalities, including navigation, object recognition, and obstacle avoidance. In some embodiments, environmental data obtained using sensor fusion results can be used to improve the robustness, safety, and flexibility of UAV operation by providing accurate location information as well as information regarding potential obstructions. The environmental data can be provided to a user (e.g., via remote controller or terminal, mobile device, or other user device) so as to inform the user's manual control of the UAV. Alternatively or in combination, the environmental data can be used for semi-autonomous or fully autonomous control systems to direct the automated flight of the UAV.

For example, the embodiments disclosed herein can be used to perform obstacle avoidance maneuvers in order to prevent the UAV from colliding with environmental objects. In some embodiments, obstacle detection and avoidance can be automated, thereby improving UAV safety and reducing user responsibility for avoiding collisions. This approach may be advantageous for inexperienced UAV operators as well as in situations where the user cannot readily perceive the presence of obstacles near the UAV. Additionally, the implementation of automated obstacle avoidance can reduce the safety risks associated with semi-autonomous or fully autonomous UAV navigation. Furthermore, the multi-sensor fusion techniques described herein can be used to generate more accurate environmental representations, thus improving the reliability of such automated collision prevention mechanisms.

Figure 5:
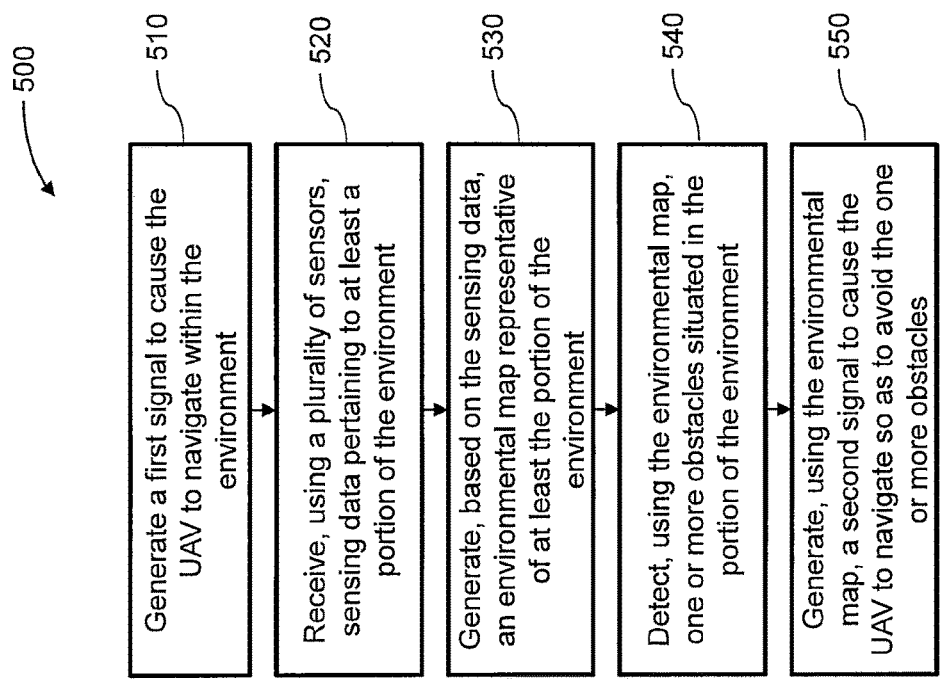
FIG. 5 illustrates a method for controlling a UAV to avoid obstacles, in accordance with embodiments.

FIG. 5 illustrates a method 500 for controlling a UAV to avoid obstacles, in accordance with embodiments. The method 500 can be implemented by one or more processors carried by the UAV. As previously described herein, the method 500 can be automated wholly or at least in part, thereby providing automatic obstacle detection and avoidance capabilities.

In step 510, a first signal is generated to cause the UAV to navigate within the environment. The first signal can include control signals for the propulsion system (e.g., rotors) of the UAV. The first signal can be generated based on user commands that are input into a remote terminal or other user device and subsequently transmitted to the UAV. Alternatively, the first signal can be autonomously generated by the UAV (e.g., an automated onboard controller). In some instances, the first signal can be generated semi-autonomously with contributions from user input as well as automated path determination mechanisms. For example, the user can indicate a series of waypoints for the UAV, and the UAV can automatically calculate a flight path to traverse the waypoints.

In some embodiments, a flight path can indicate a sequence of desired positions and/or orientations for the UAV (e.g., with respect to up to six degrees of freedom). For instance, the flight path can include at least an initial location and target location for the UAV. Optionally, the flight path can be configured to direct the UAV from a current position to a previous position. As another example, the flight path can include a target flight direction for the UAV. In some embodiments, the instructions can specify velocity and/or acceleration for the UAV (e.g., with respect to up to six degrees of freedom) to cause it to move along the flight path.

In step 520, sensing data pertaining to at least a portion of the environment is received using a plurality of sensors. The plurality of sensors can include sensors of different types (e.g., vision, lidar, ultrasonic, GPS, etc.). The sensing data can include information regarding the location and characteristics of obstacles and/or other environmental objects. For example, the sensing data can include distance information indicating the proximity of the UAV to nearby obstacles. Optionally, the sensing data can include information relating to a portion of the environment along a flight path of the UAV, such as a portion overlapping with or near the flight path.

In step 530, an environmental map representative of at least the portion of the environment is generated based on the sensing data. The environmental map may be a local map representing the portion of the environment immediately surrounding the UAV (e.g., within a radius of about 2 m, 5 m, 10 m, 15 m, 20 m, 25 m, or 50 m from the UAV). Alternatively, the environmental map may be a global map that also represents portions of the environment that are relatively far from the UAV (e.g., within a radius of about 25 m, 50 m, 75 m, 100 m, 125 m, 150 m, 200 m, 225 m, 250 m, 300 m, 400 m, 500 m, 1000 m, 2000 m, or 5000 m from the UAV). The size of the environmental map may be determined based on the effective range of the sensors used in step 510, as previously described. In some embodiments, the environmental map can be produced using the sensor fusion-based methods previously described herein (e.g., scheme 300 and/or method 400). For instance, the sensing data can include data relative to a plurality of different coordinate systems and the environmental map generation can involve mapping the data onto a single coordinate system so as to facilitate the fusion of the sensing data.

In step 540, the environmental map is used to detect one or more obstacles situated in the portion of the environment. Obstacle detection from map information can be performed using various strategies such as by feature extraction or pattern recognition techniques. Optionally, suitable machine learning algorithms can be implemented to perform obstacle detection. In some embodiments, if the environmental map is an occupancy grid map, obstacles can be identified by detecting volumes in the occupancy grid map that are continuously occupied. The obstacle detection results may provide information regarding the position, orientation, size, proximity, and/or type of each obstacle, as well as corresponding confidence information for the result. The map can be analyzed to identify obstacles that pose a collision risk to the UAV (e.g., are positioned along or near the flight path).

In step 550, a second signal is generated using the environmental map to cause to UAV to navigate so as to avoid the one or more obstacles. The environmental map can be analyzed in order to determine the location of the one or more obstacles relative to the UAV, as well as the location of any unobstructed spaces through which the UAV can move in order to avoid colliding with the obstacle. The second signal can thus provide appropriate control signals (e.g., for the propulsion system of the UAV) to cause the UAV to navigate through the unobstructed spaces. In embodiments where the UAV is navigated according to a flight path, the flight path can be modified based on the environmental map so as to avoid the one or more obstacles and the UAV can be navigated according to the modified flight path. The flight path modifications can direct the UAV to traverse only through unobstructed spaces. For instance, the flight path can be modified so as to cause the UAV to fly around the obstacle (e.g., above, below, or to the side), fly away from the obstacle, or maintain a specified distance from the obstacle. In situations where multiple modified flight paths are possible, a preferred flight path can be selected based on any suitable criteria, such as minimizing the distance traveled, minimizing the travel time, minimizing the amount of energy needed to travel the path, minimizing the amount of deviation from the original flight path, etc. Optionally, if an appropriate flight path cannot be determined, the UAV may simply hover in place and wait for the obstacle to move out of the way, or wait for the user to assume manual control.

In another exemplary application of multi-sensor fusion for UAV operation, the embodiments presented herein can be implemented as part of an "auto-return" functionality, in which the UAV will automatically navigate from the current location to a "home" location under certain circumstances. The home location may be an initial location that was previously traveled by the UAV, such as the location where the UAV initially took off and started flight. Alternatively, the home location may not be a location that the UAV has previously traveled to. The home location can be determined automatically or specified by the user. Examples of situations where the auto-return function may be triggered include receipt of an instruction to return from the user, loss of communication with the user's remote controller or other indication that the user is no longer able to control the UAV, low UAV battery level, or detection of a UAV malfunction or other emergency situations.

Figure 6:
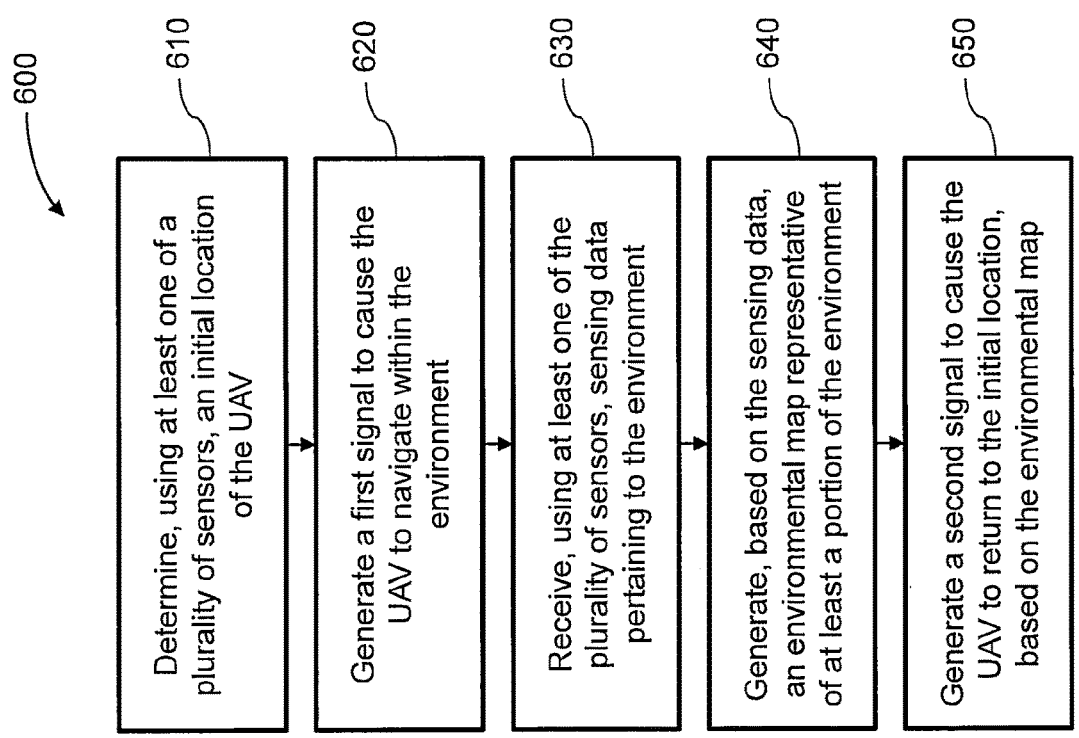
FIG. 6 illustrates a method for controlling a UAV to return to an initial location, in accordance with embodiments.

FIG. 6 illustrates a method 600 for controlling a UAV to return to an initial location, in accordance with embodiments. In some embodiments, the method 600 is implemented by one or more processors associated with an automated control system, such that little or no user input is needed to perform the method 600.

In step 610, an initial location of the UAV is determined using at least one of a plurality of sensors. In some embodiments, the location can be determined using multiple sensors having different sensor types. The location can be determined relative to a global coordinate system (e.g., GPS coordinates) or relative to a local coordinate system (e.g., relative to local environmental landmarks or features).

In step 620, a first signal is generated to cause the UAV to navigate within the environment. The first signal can be generated manually, semi-autonomously, or fully autonomously. For instance, a user can input instructions into a remote controller that are transmitted to the UAV in order to control UAV movement. As another example, the UAV can move according to a predetermined flight path or travel to a predetermined location. The UAV can be navigated to a location within the environment that is different from the initial location (e.g., with respect to longitude, latitude, or altitude).

In step 630, sensing data pertaining to the environment is received from at least one of the plurality of sensors. The sensing data can be received from the same sensors used in step 610, or from different sensors. Similarly, the sensing data can be obtained from a plurality of different sensor types. Such sensing data can include information regarding the location and characteristics of environmental objects, as previously described herein.

In step 640, an environmental map representative of at least a portion of the environment is generated based on the sensing data. In embodiments where the sensing data includes data from multiple sensor types, the environmental map can be produced using the sensor fusion-based methods previously described herein (e.g., scheme 300 and/or method 400). The resultant map can be provided in any suitable format and may include information pertaining to obstacle occupancy (e.g., an obstacle grid map).

In step 650, a second signal is generated to cause the UAV to return to the initial location based on the environmental map. The second signal can be generated in response to an auto-return instruction. The auto-return instruction can be input by a user or can be generated automatically, e.g., in response to an emergency situation such as loss of communication with a remote controller controlling the UAV. In some embodiments, once the UAV has received an instruction to auto-return, the UAV can use the environmental map to determine its current location, the spatial relationship between the current and initial locations, and/or the locations of any environmental obstacles. Based on the obstacle occupancy information in the environmental map, the UAV can then determine an appropriate path (e.g., a flight path) to navigate from the current location to the initial location. Various approaches can be used to determine a suitable path for the UAV. For example, the path can be determined using an environmental map such as a topology map, as described in further detail herein with respect to FIGS. 9A and 9B. In some embodiments, the path can be configured to avoid one or more environmental obstacles that may obstruct the flight of the UAV. Alternatively or in combination, the path may be the shortest path between the current and initial locations. The path may include one or more portions that were previously traveled by the UAV, as well as one or more portions that are different from a previously traveled path of the UAV. For instance, the entirety of the path may have been previously traveled by the UAV. As another example, the path can include a plurality of waypoints corresponding to previously traveled positions of the UAV, as described in further detail herein with respect to FIGS. 8A and 8B. Conversely, the entirety of the path may not have been previously traveled by the UAV. In some embodiments, a plurality of potential paths can be generated, and one path selected from the plurality based on suitable criteria (e.g., minimizing total flight time, minimizing total flight distance, minimizing energy expenditure, minimizing number of obstacles encountered, maintaining a predetermined distance from obstacles, maintaining a predetermined altitude range, etc.). Flight path information for the UAV (e.g., previously traveled paths, potential paths, selected paths) may be included in the environmental map.

Once the path has been determined, the path information can be processed to generate instructions for controlling the propulsion system of the UAV so as to cause it to travel along the path to the initial location. For instance, the path may include a sequence of spatial location and orientation information for the UAV that can be converted into control signals to direct the flight of the UAV from the current location to the initial location. In some embodiments, as the UAV is navigating along the path, it may detect one or more obstacles along the path that obstruct its flight. In such situations, the path can be modified to avoid the obstacle so as to permit the UAV to continue navigating to the initial location, e.g., using the techniques previously described herein with respect to the method 500.

Figure 7:
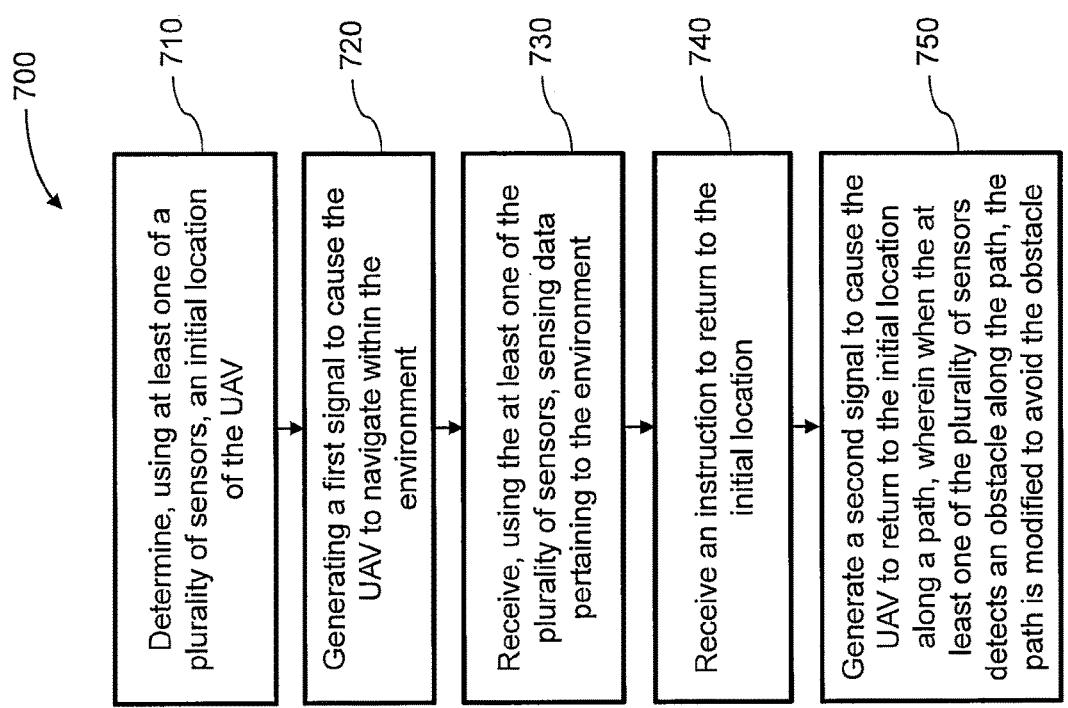
FIG. 7 illustrates a method for controlling a UAV to return to an initial location while avoiding obstacles, in accordance with embodiments.

FIG. 7 illustrates a method 700 for controlling a UAV to return to an initial location while avoiding obstacles, in accordance with many embodiments. Similar to the method 500, the method 700 can be performed in a semi-automated or fully-automated manner as part of a UAV auto-return function. At least some of the steps of the method 700 can be carried out by one or more processors associated with the UAV.

In step 710, an initial location of the UAV is determined using at least one of a plurality of sensors. Optionally, the initial location can be determined using a plurality of different sensor types. The location information can include information regarding the position (e.g., altitude, latitude, longitude) and/or orientation (e.g., roll, pitch, yaw) of the UAV. The location information can be provided relative to a global coordinate system (e.g., geographic coordinate system) or a local coordinate system (e.g., relative to the UAV).

In step 720, a first signal is generated to cause the UAV to navigate within the environment, e.g., to a location different than the initial location. As previously described herein, the first signal can be generated based on user input, instructions provided by an autonomous control system, or suitable combinations thereof.

In step 730, sensing data pertaining to the environment is received using the at least one of the plurality of sensors. Optionally, the sensing data can be received from sensors that are different from the sensors used in step 710. The sensing data can be generated by combining sensing signals from different sensor types using suitable sensor fusion-based approaches, as described above. In some embodiments, the fused sensor data can be used to produce a representative environmental map, such as the embodiments previously discussed herein.

In step 740, an instruction to return to the initial location is received. The return instruction can be input by a user into a remote controller and subsequently transmitted to the UAV. Alternatively, the instruction can be automatically generated by the UAV, such as by an onboard processor and/or controller. In some embodiments, the instruction can be generated independently of any user input, e.g., in a situation where the UAV detects that communication between the user device and UAV has been lost, when a malfunction or emergency has occurred, etc.

In step 750, a second signal is generated to cause the UAV to return to the initial location along a path, wherein when the at least one of the plurality of sensors detects an obstacle along the path, the path is modified to avoid the obstacle. Optionally, the sensors used to detect the obstacle may be different from the sensors used in step 710 and/or step 730. The obstacle can be detected based on sensing data generated by a plurality of different sensor types. In some embodiments, the obstacle can be detected using an environmental map (e.g., an occupancy grid map) produced based on sensor data. The environmental map may have been previously generated (e.g., based on the sensing data collected in step 730) or may be generated in real time as the UAV navigates along the path. Various approaches can be used to modify the path so as to prevent the UAV from colliding with the detected obstacles, such as those previously described herein with respect to the method 500. The determination of a revised path can be performed based on obtained sensing data and/or obstacle information represented in the environmental map.

Figure 8A:
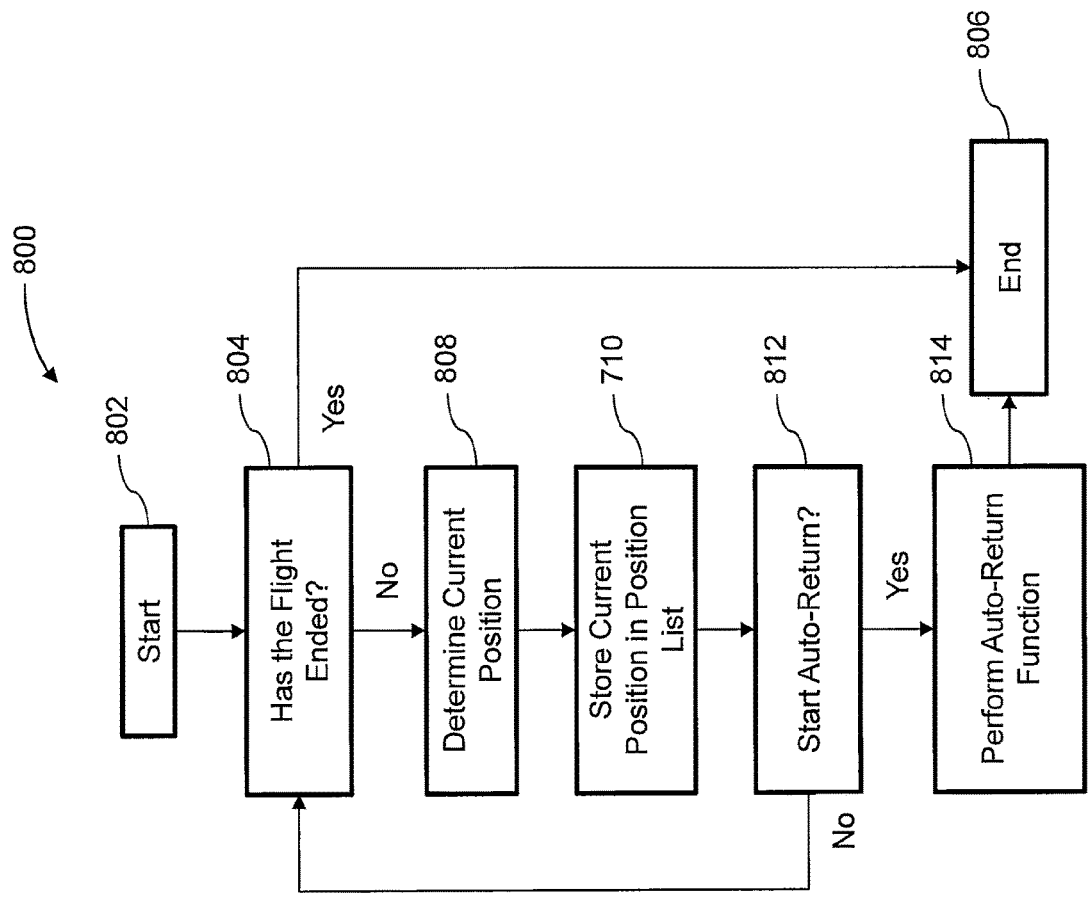
FIGS. 8A and 8B illustrate an algorithm for controlling a UAV to return to an initial location using waypoints, in accordance with embodiments.
Figure 8B:
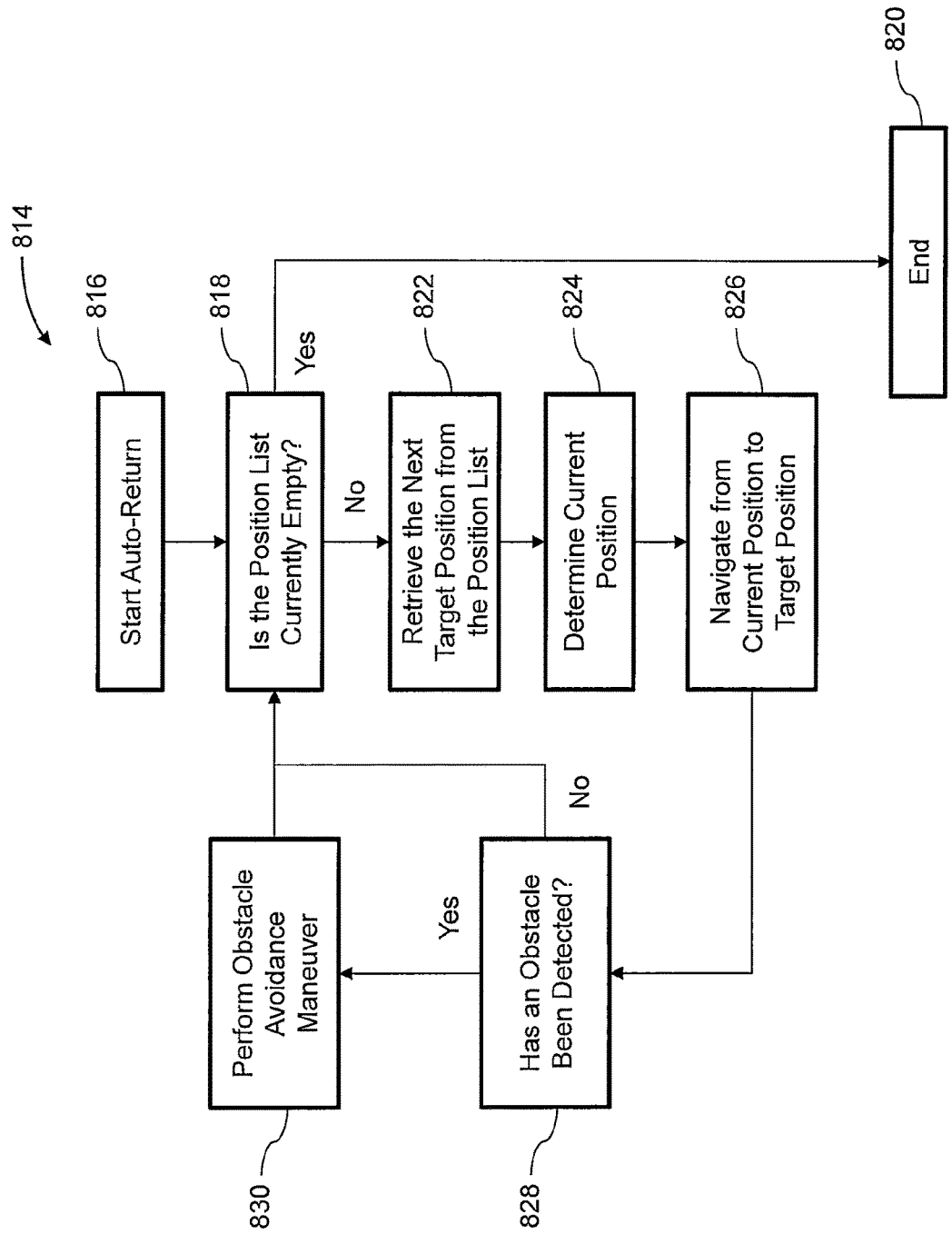

FIGS. 8A and 8B illustrate an algorithm 800 for controlling a UAV to return to an initial location using waypoints, in accordance with embodiments. The algorithm 800 can be implemented by a suitable processor and/or controller used to control the operation of the UAV. One or more steps of the algorithm 800 can be performed automatically, thereby providing auto-return functionality to the UAV.

Following the start of UAV flight in step 802 (e.g., takeoff), a determination is made in step 804 as to whether the UAV flight has ended. The determination can be based on whether the UAV has landed (e.g., on a surface such as the ground), whether the propulsion system of the UAV has been turned off, whether the user has provided an instruction that the flight is ended, and so on. If the flight has ended, the algorithm 800 is concluded at step 806. Otherwise, the algorithm 800 proceeds to step 808 in order to determine the current position (e.g., latitude, longitude, altitude) of the UAV. The current position can be determined using one or more sensors, at least some of which have different types, as previously described herein. For example, the UAV can include a GPS sensor and another sensor type such as a vision sensor. The vision sensing data can be used in combination with or instead of the GPS sensing data so as to compensate for situations when the GPS sensor is unable to provide reliable sensing data (e.g., in indoor and/or low altitude environments where communication with GPS satellites may be suboptimal, at the start of flight when the GPS sensor has yet to establish communication with GPS satellites). Accordingly, the positioning accuracy can be improved through the combined use of GPS and vision sensing data. Optionally, the current position can be determined using an environmental map that enables the UAV to be located relative to a global or local coordinate system. The environmental map may be generated using sensor fusion techniques, as described above.

In step 810, the current position information is stored in a suitable data structure, such as a list of position information. The position list can be used to store a set of positions previously traveled by the UAV, which may be referred to herein as "waypoints." The waypoints can be stored in sequential order, thereby providing a representation of the flight path traveled by the UAV. In such embodiments, the first waypoint stored in the position list corresponds to the initial position of the UAV while the last waypoint in the position list corresponds to the most recent position of the UAV. Accordingly, the stored waypoints can be traveled in reverse order (from last to first) in order to cause the UAV to return to the initial location, as described below.

In step 812, a determination is made as to whether the UAV should initiate the auto-return function in order to return to the initial location corresponding to the first stored waypoint in the position list. The auto-return decision can be made automatically or based on user input, as previously described herein. If the auto-return function is not initiated, the algorithm 800 returns to step 804 to begin the next iteration of waypoint determination and storage. In some embodiments, the steps 804, 808, 810, and 812 can be repeated sequentially at a desired frequency (e.g., continuously, at predetermined time intervals such as once every 0.5 s, 1 s, 2 s, 5 s, 10 s, 20 s, or 30 s) so as to generate and a store a series of previously traveled waypoints during UAV flight. Once it is determined in step 812 that the UAV should auto-return, the auto-return function is performed in step 814, as described in further detail below with respect to FIG. 8B. Following the completion of the auto-return function, the algorithm 800 concludes in step 806.

FIG. 8B illustrates the sub-steps of step 814 of the algorithm 800, in accordance with embodiments. Following the initiation of the auto-return function at step 816, a determination is made in step 818 as to whether the position list (list of waypoints) is empty. If the list is empty, this indicates that the UAV has arrived at the initial location and the auto-return function is completed in step 820. If the list is not empty, this indicates that the UAV has not yet arrived at the initial location. In such instances, the next target position (waypoint) is then retrieved from the position list in step 822.

The current position of the UAV is then determined in step 824. The current position can be determined using any of the approaches described herein, such as using multi-sensor fusion and/or environmental mapping. In some embodiments, the spatial relationship between the current position and retrieved target position is determined in order to generate a flight path between the current and target positions. As previously described above, the flight path can be generated based on environmental mapping data so as to avoid potential flight obstructions.

In step 826, the UAV is navigated from the current position to the target position, e.g., using the flight path generated in step 824. As the UAV moves towards the target position, it can obtain and process sensor data to determine whether there are any obstacles obstructing its flight. For instance, the sensor data can be used to provide a local environmental map including obstacle occupancy information, as discussed above. Exemplary sensors that can be used to provide obstacle information include vision sensors, lidar sensors, ultrasonic sensors, and the like. Based on the sensor data, a determination is made in step 828 as to whether an obstacle has been detected. If no obstructions are detected, the UAV completes its navigation to the target position and the auto-return function proceeds to step 818 to begin the next iteration. If an obstacle has been detected, an appropriate obstacle avoidance maneuver is determined and performed, as indicated in step 830. For instance, the flight path can be modified (e.g., based on environmental map data) so that the UAV navigates to the target location without colliding with the detected obstacle.

Figure 9B:
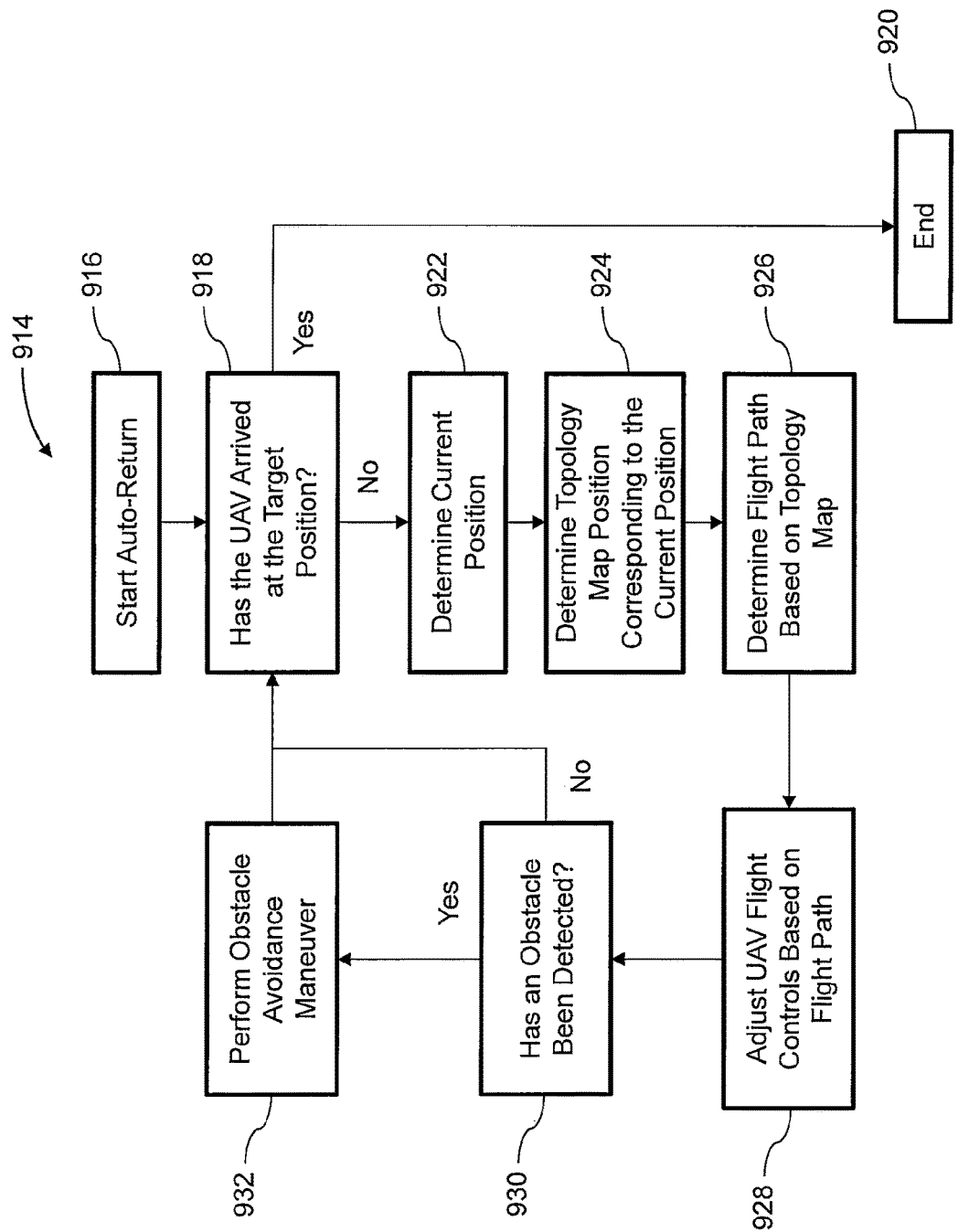

FIGS. 9A and 9B illustrate an algorithm 900 for controlling a UAV to return to a target location using a topology map, in accordance with embodiments. Similar to the algorithm 800, the algorithm 900 can be implemented by a suitable processor and/or controller used to control the operation of the UAV. One or more steps of the algorithm 900 can be performed automatically, thereby providing auto-return functionality to the UAV.

Following the start of UAV flight in step 902 (e.g., takeoff), a determination is made in step 904 as to whether the UAV flight has ended, similar to the step 802 of the algorithm 800. If the flight has ended, the algorithm 900 is concluded at step 906. Otherwise, the algorithm 900 proceeds to step 908 in order to determine the current position of the UAV as well as environmental information pertaining to the environment surrounding the UAV. In some embodiments, the environmental information includes information regarding the spatial disposition, geometry, and/or characteristics of one or more environmental objects, as previously described herein. The current position and/or environmental information can be determined using sensing data obtained from one or more sensors. Optionally, sensing data from different sensor types can be processed and combined using sensor fusion techniques in order to improve the reliability and accuracy of the sensing result. For instance, the sensing data can be obtained from a GPS sensor and at least one other sensor type (e.g., a vision sensor, lidar sensor, and/or ultrasonic sensor).

In step 910, the current position and environmental information is added to a topology map representative of the operating environment. In alternative embodiments, other types of maps can also be used (e.g., metric maps such as a grid map). The topology map can be used to store position information corresponding to locations previously traveled by the UAV, thereby providing a record of the flight path of the UAV. Additionally the topology map can be used to depict the connectivity between various environmental locations, in accordance with embodiments previously described herein. Optionally, the topology map can also include metric information, such as information indicating the distances between the represented locations, as well as information indicating the spatial location and geometry of environmental objects. At least some portions of the topology map can be generated during UAV flight, e.g., using multi-sensor mapping. Alternatively or in combination, one or more portions of the topology map can be generated prior to the operation of the UAV and provided to the UAV (e.g., transmitted from a remote controller and/or stored in an onboard memory). In the latter embodiment, the topology map can be refined or modified during UAV operation based on collected sensor data in order to reflect the current environmental information.

In step 912, a determination is made as to whether the UAV should initiate the auto-return function in order to return to a target position, similar to the step 812 of the algorithm 800. If the auto-return function is not initiated, the algorithm 900 returns to step 904. The steps 904, 908, 910, and 912 can be repeated sequentially at a desired frequency (e.g., continuously, at predetermined time intervals such as once every 0.5 s, 1 s, 2 s, 5 s, 10 s, 20 s, or 30 s) so as to update the topology map with the most recent position and environmental information as the UAV navigates within the environment. Once it is determined in step 912 that the UAV should auto-return, the auto-return function is performed in step 914, as described in further detail below with respect to FIG. 9B. Following the completion of the auto-return function, the algorithm 900 concludes in step 906.

FIG. 9B illustrates the sub-steps of step 914 of the algorithm 900, in accordance with embodiments. Following the initiation of the auto-return function at step 916, a determination is made in step 918 as to whether the UAV has arrived at the target position. The target position can be a position specified by a user or automatically determined by the UAV. The target position can be a position that has been previously traveled by the UAV, such as the initial position of the UAV at the start of flight (e.g., the location of takeoff). Alternatively, the target position can be a position that has not been previously traveled by the UAV. If it is determined that the UAV has arrived at the target position, the auto-return function is completed in step 920. Otherwise, the auto-return proceeds to step 924.

In step 924, the current position of the UAV is determined using any of the approaches described herein, such as using multi-sensor fusion and/or environmental mapping. In step

926, the topology map position corresponding to the current UAV position is determined, thereby locating the UAV relative to the environmental information represented in the topology map. Based on the topology map, a flight path from the current position to the target position is determined in step 926. In some embodiments, one or more portions of the return flight path may correspond to a flight path previously traveled by the UAV. Alternatively, one or more portions of the flight path may be different from the previous flight path of the UAV. The flight path can determined based on any suitable criteria. For example, the flight path can be configured to avoid environmental obstacles. As another example, the flight path can be configured to minimize the total distance traveled by the UAV to reach the target position. Subsequently, in step 928, the UAV flight controls are adjusted based on the determined flight path in order to cause the UAV to move along the flight path. For instance, the flight path can specify a series of positions and/or orientations for the UAV, and suitable control signals can be generated and transmitted to the UAV propulsion systems so as to cause the UAV to assume the specified position and/or orientations.

As the UAV moves towards the target position, it can detect obstacles and perform obstacle avoidance maneuvers as appropriate, as depicted in steps 930 and 932. The techniques for performing obstacle detection and avoidance can be similar to those described with respect to the steps 828 and 830 of the algorithm 800, respectively. Optionally, obstacle detection and/or avoidance can be based on the generated topology map. For example, once an obstacle has been identified, the environmental information represented in the topology map can be used to determine suitable modifications to the flight path that avert potential collisions.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 10:
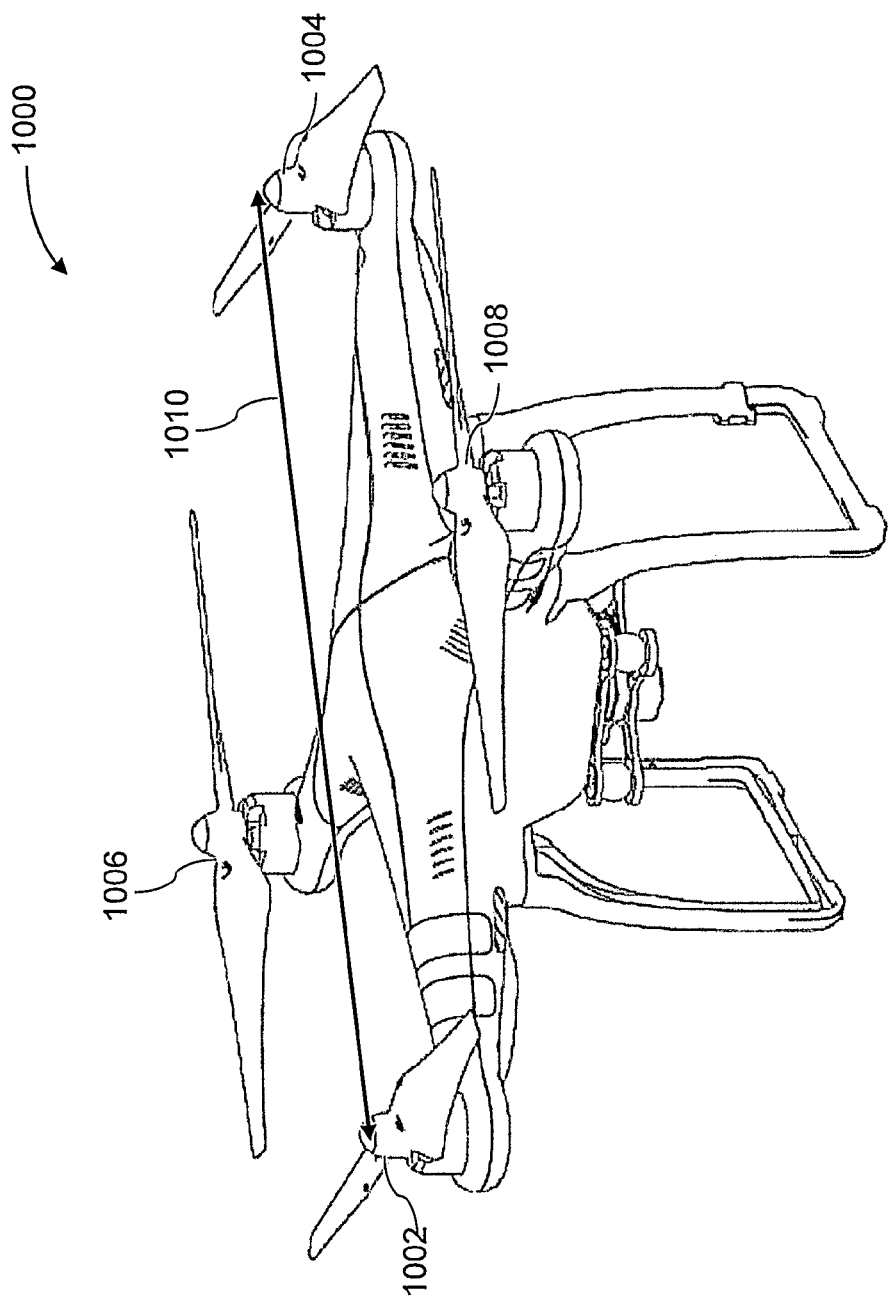
FIG. 10 illustrates a UAV, in accordance with embodiments.

FIG. 10 illustrates an unmanned aerial vehicle (UAV) 1000, in accordance with embodiments of the present disclosure. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
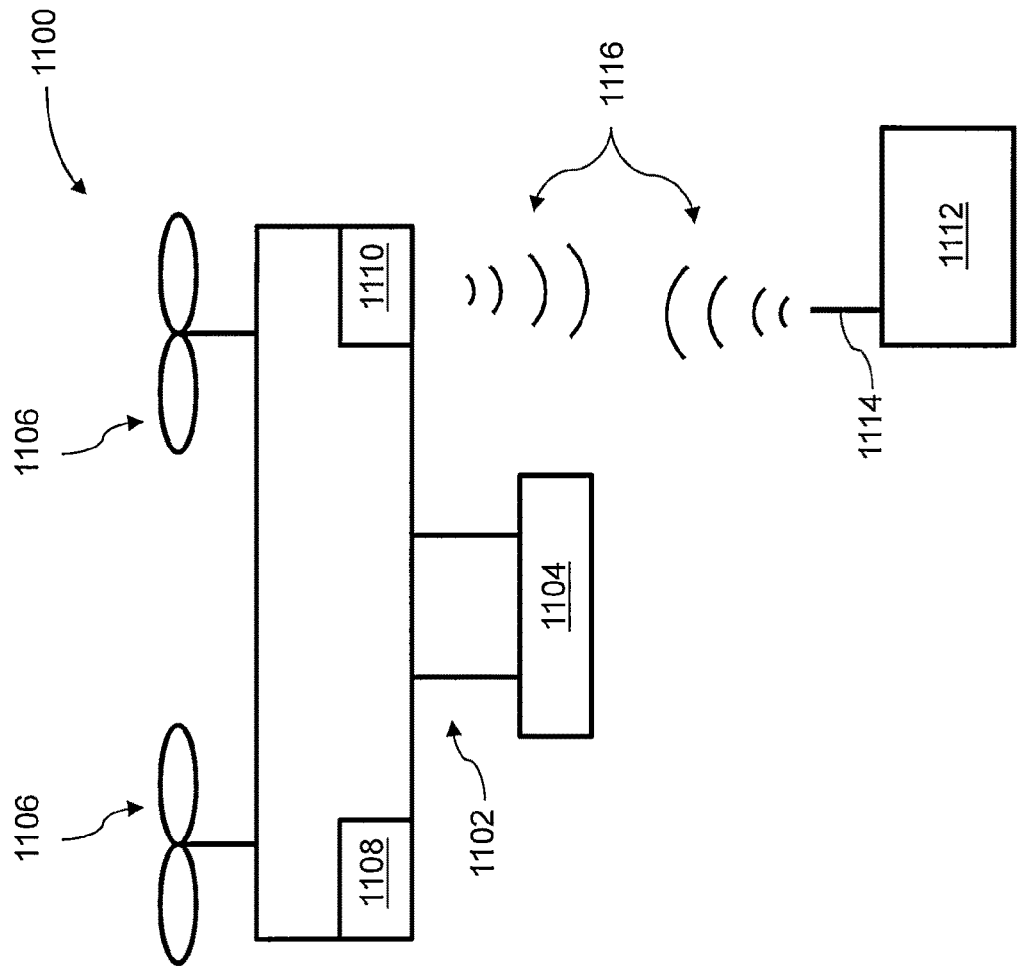
FIG. 11 illustrates a movable object including a carrier and a payload, in accordance with embodiments.

FIG. 11 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. For example, the propulsion mechanisms 1106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 12:
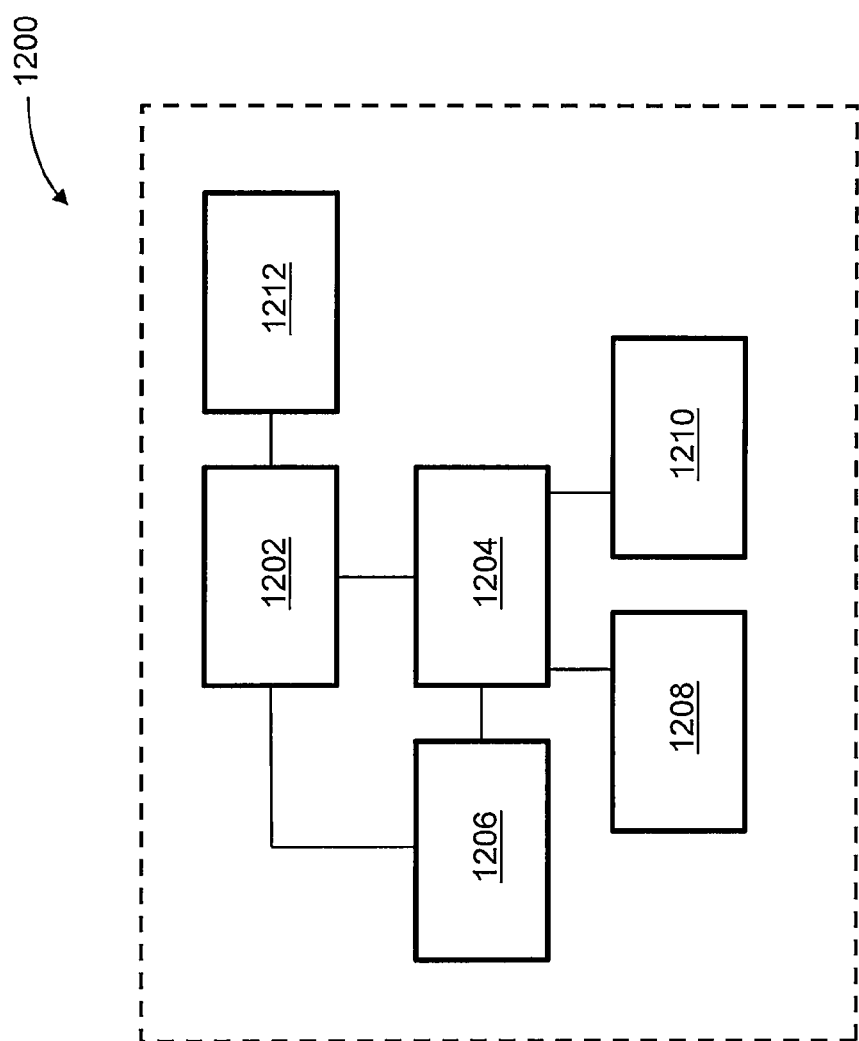
FIG. 12 illustrates a system for controlling a movable object, in accordance with embodiments.

FIG. 12 is a schematic illustration by way of block diagram of a system 1200 for controlling a movable object, in accordance with embodiments. The system 1200 can be used in combination with any suitable embodiment of the systems, devices, and methods disclosed herein. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to analyze sensing data produced by the sensing module. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

As used herein A and/or B encompasses one or more of A or B, and combinations thereof such as A and B.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method for controlling an unmanned aerial vehicle (UAV) in an environment, the method comprising:

receiving a first sensing signal from a vision sensor coupled to the UAV and a second sensing signal from a proximity sensor coupled to the UAV, the first sensing signal including first depth information of the environment and the second sensing signal including second depth information of the environment;

selecting the first sensing signal for generating a first portion of an environmental map and the second sensing signal for generating a second portion of the environmental map based on a suitable criterion, wherein the suitable criterion is associated with distinct characteristics of various portions of the environment or distinct capabilities of the vision sensor and the proximity sensor, the first sensing signal is more suitable than the second sensing signal for generating the first portion of the environmental map, the second sensing signal is more suitable than the first sensing signal for generating the second portion of the environmental map, and the first portion is different from the second portion;

generating a first set of depth images for the first portion of the environmental map based on the first sensing signal and a second set of depth images for the second portion of the environmental map based on the second sensing signal, the first set of depth images including a portion of the first depth information corresponding to the first portion of the environmental map and the second set of depth images including a portion of the second depth information corresponding to the second portion of the environmental map;

combining the first set of depth images and the second set of depth images to generate the environmental map; and effecting the UAV to navigate in the environment using the environmental map.

2. The method of claim 1, wherein the suitable criterion comprises at least one of: signal qualities or accuracies of the first sensing signal and the second sensing signal for the various portions of the environment, an environment type for the various portions of the environment, a weather condition for the various portions of the environment, relative locations or properties of one or more sensed environmental objects for the various portions of the environment, an object density or distribution for the various portions of the environment, or different sensing ranges of the vision sensor and the proximity sensor.

3. The method of claim 1, wherein the combining of the first set of depth images and the second sets of depth images comprises:
identifying one or more first feature points in the first set of depth images;
identifying corresponding one or more second feature points in the second set of depth images;
determining a correspondence between the one or more first feature points and the one or more second feature points; and
combining the first set of depth images and the second set of depth images based on the determined correspondence to generate the environmental map.

4. The method of claim 1, wherein the effecting of the UAV to navigate in the environment comprises:
determining locations of obstacles in the environment based on the environmental map; and
determining a flight path to avoid the obstacles based on the determined locations of the obstacles.

5. The method of claim 1, wherein the effecting of the UAV to navigate in the environment comprises:
determining a current location of the UAV using at least one of a plurality of sensors coupled to the UAV, wherein the plurality of sensors comprise at least the vision sensor and the proximity sensor;
determining a flight path from the current location to an initial location that was previously traveled by the UAV or a specified location; and
effecting the UAV to move along the flight path to the initial location or the specified location.

6. The method of claim 5, wherein the plurality of sensors are selected from: the vision sensor, an image sensor, a camera, the proximity sensor, a range sensor, a light sensor, a LiDAR sensor, an acoustic sensor, an ultrasonic sensor, a location sensor, a Global Positioning System (GPS) sensor, a speed sensor, a pressure sensor, a thermal sensor, and an environmental sensor.

7. The method of claim 5, wherein the determining of the flight path comprises:
determining the flight path among a plurality of potential flight paths based on a set of operational criteria.

8. The method of claim 7, wherein the set of operational criteria is associated with minimizing at least one of a flight time, a flight distance, an energy consumption, a number of obstacles along each flight path of the plurality of potential flight paths, distances of the UAV from obstacles along each flight path of the plurality of potential flight paths, or an altitude range of the UAV.

9. The method of claim 1, wherein the environmental map comprises a topological map, a metric map, or a combination of the topological map and the metric map.

10. The method of claim 1, wherein the first portion of the environmental map is different from the second portion of the environmental map.

11. A system for controlling an unmanned aerial vehicle (UAV) in an environment, the system comprising:
a plurality of sensors coupled to the UAV and including at least a vision sensor and a proximity sensor; and
one or more processors, individually or collectively, configured to:
receive a first sensing signal from the vision sensor and a second sensing signal from the proximity sensor, the first sensing signal including first depth information of the environment and the second sensing signal including second depth information of the environment;
select the first sensing signal for generating a first portion of an environmental map and the second sensing signal for generating a second portion of the environmental map based on a suitable criterion, wherein the suitable criterion is associated with distinct characteristics of various portions of the environment or distinct capabilities of the vision sensor and the proximity sensor, the first sensing signal is more suitable than the second sensing signal for generating the first portion of the environmental map, the second sensing signal is more suitable than the first sensing signal for generating the second portion of the environmental map, and the first portion is different from the second portion;
generate a first set of depth images for the first portion of the environmental map based on the first sensing signal and a second set of depth images for the second portion of the environmental map based on the second sensing signal, the first set of depth images including a portion of the first depth information corresponding to the first portion of the environmental map and the second set of depth images including a portion of the second depth information corresponding to the second portion of the environmental map;
combine the first set of depth images and the second set of depth images to generate the environmental map; and
effect the UAV to navigate in the environment using the environmental map.

12. The system of claim 11, wherein the suitable criterion comprises at least one of: signal qualities or accuracies of the first sensing signal and the second sensing signal for the various portions of the environment, an environment type for the various portions of the environment, a weather condition for the various portions of the environment, relative locations or properties of one or more sensed environmental objects for the various portions of the environment, an object density or distribution for the various portions of the environment, or different sensing ranges of the vision sensor and the proximity sensor.

13. The system of claim 11, wherein to combine the first set of depth images and the second set of depth images, the one or more processors are, individually or collectively, configured to:
identify one or more first feature points in the first set of depth images;
identify corresponding one or more second feature points in the second set of depth images;
determine a correspondence between the one or more first feature points and the one or more second feature points; and
combine the first set of depth images and the second set of depth images based on the determined correspondence to generate the environmental map.

14. The system of claim 11, wherein to effect the UAV to navigate in the environment, the one or more processors are, individually or collectively, configured to:
determine locations of obstacles in the environment based on the environmental map; and
determine a flight path to avoid the obstacles based on the determined locations of the obstacles.

15. The system of claim 11, wherein to effect the UAV to navigate in the environment, the one or more processors are, individually or collectively, configured to:
determine a current location of the UAV using at least one of the plurality of sensors coupled to the UAV;

determine a flight path from the current location to an initial location that was previously traveled by the UAV or a specified location; and effect the UAV to move along the flight path to the initial location or the specified location.

16. An unmanned aerial vehicle (UAV), comprising:

a plurality of sensors coupled to the UAV including at least a vision sensor and a proximity sensor;

a propulsion system; and one or more processors, individually or collectively, configured to:

receive a first sensing signal from the vision sensor and a second sensing signal from the proximity sensor, the first sensing signal including first depth information of the environment and the second sensing signal including second depth information of the environment;

select the first sensing signal for generating a first portion of an environmental map and the second sensing signal for generating a second portion of the environmental map based on a suitable criterion, wherein the suitable criterion is associated with distinct characteristics of various portions of the environment or distinct capabilities of the vision sensor and the proximity sensor, the first sensing signal is more suitable than the second sensing signal for generating the first portion of the environmental map, the second sensing signal is more suitable than the first sensing signal for generating the second portion of the environmental map, and the first portion is different from the second portion;

generate a first set of depth images for the first portion of the environmental map based on the first sensing signal and a second set of depth images for the second portion of the environmental map based on the second sensing signal, the first set of depth images including a portion of the first depth information corresponding to the first portion of the environmental map and the second set of depth images including a portion of the second depth information corresponding to the second portion of the environmental map;

combine the first set of depth images and the second set of depth images to generate the environmental map; and control the propulsion system for effecting the UAV to navigate in the environment using the environmental map.

17. The UAV of claim 16, wherein the suitable criterion comprises at least one of: signal qualities or accuracies of the first sensing signal and the second sensing signal for the various portions of the environment, an environment type for the various portions of the environment, a weather condition for the various portions of the environment, relative locations or properties of one or more sensed environmental objects for the various portions of the environment, an object density or distribution for the various portions of the environment, or different sensing ranges of the vision sensor and the proximity sensor.

18. The UAV of claim 16, wherein to combine the first set of depth images and the second set of depth images, the one or more processors are, individually or collectively, configured to:

identify one or more first feature points in the first set of depth images;

identify corresponding one or more second feature points in the second set of depth images;

determine a correspondence between the one or more first feature points and the one or more second feature points; and combine the first set of depth images and the second set of depth images based on the determined correspondence to generate the environmental map.

19. The UAV of claim 16, wherein to control the propulsion system for effecting the UAV to navigate in the environment, the one or more processors are, individually or collectively, configured to:

determine locations of obstacles in the environment based on the environmental map; and determine a flight path to avoid the obstacles based on the determined locations of the obstacles.

20. The UAV of claim 16, wherein to control the propulsion system for effecting the UAV to navigate in the environment, the one or more processors are, individually or collectively, configured to:

determine a current location of the UAV using at least one of the plurality of sensors coupled to the UAV;

determine a flight path from the current location to an initial location that was previously traveled by the UAV or a specified location; and control the propulsion system for effecting the UAV to move along the flight path to the initial location or the specified location.

* * * * *